United States Patent
Matsunaga et al.

[11] Patent Number: 6,115,417
[45] Date of Patent: Sep. 5, 2000

[54] SIGNAL QUALITY MEASURING SCHEME

[75] Inventors: Mari Matsunaga; Takashi Asahara; Toshiharu Kojima, all of Tokyo, Japan

[73] Assignee: Mitsubishi Denki Kabushiki Kaisha, Tokyo, Japan

[21] Appl. No.: 09/362,234

[22] Filed: Jul. 28, 1999

[30] Foreign Application Priority Data

Apr. 23, 1999 [WO] WIPO ................. PCT/JP99/02174

[51] Int. Cl.[7] ................................................. H04B 17/00
[52] U.S. Cl. ...................... 375/226; 455/67.1; 455/226.1
[58] Field of Search ................................ 375/224, 226, 375/316, 347; 455/67.1, 226.1

[56] References Cited

U.S. PATENT DOCUMENTS

| | | | |
|---|---|---|---|
| 4,542,514 | 9/1985 | Watanabe | 375/224 |
| 5,103,461 | 4/1992 | Tymes | 375/200 |
| 5,793,805 | 8/1998 | Nikides | 375/224 |

OTHER PUBLICATIONS

Scholz, J.B., et al., "A Scheme for High Performance Real–Time BER Measurement", IEEE Transactions on Communications, vol. 40, No. 10, Oct. 1992, pp. 1574–1576.

*Primary Examiner*—Temesghen Ghebretinsae
*Attorney, Agent, or Firm*—Rothwell, Figg, Ernst & Manbeck

[57] ABSTRACT

A phase region deciding unit decides the phase region in which the signal point falls and a counter unit counts the number of signal points in each phase region. A weighted average calculating unit calculates a weighted average using the previous weighted average and a result of counting in the counter unit. A likelihood calculating unit calculates likelihood of the weighted average of phase distribution calculated weighted average using the phase-distribution table stored in a phase-distribution table storing unit for each phase-distribution model, detects a maximum likelihood phase-distribution model, and outputs the signal quality corresponding to the detected phase-distribution model as the estimated signal quality.

14 Claims, 11 Drawing Sheets

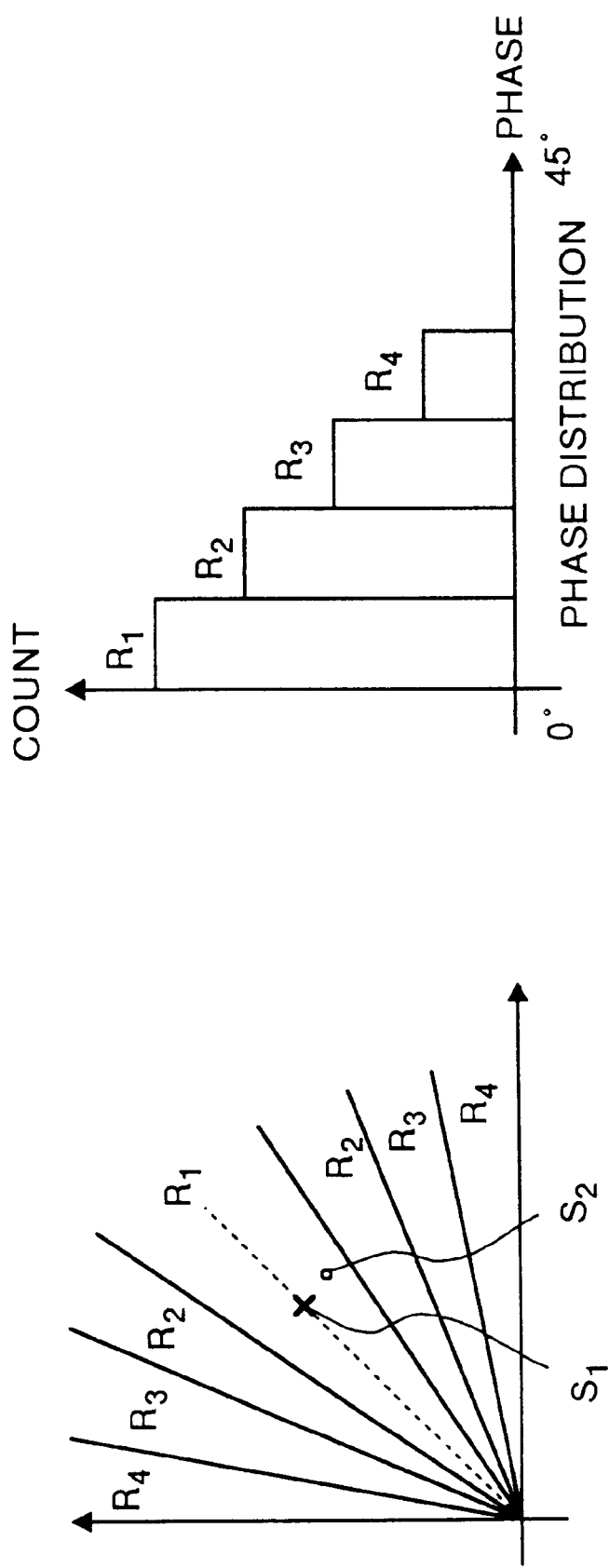

SIGNAL QUALITY MEASURING SCHEME

FIELD OF THE INVENTION

The present invention relates to a signal quality measuring scheme for a receiver which receiver is used in a digital radio communication system such as satellite communications or mobile communications or mobile satellite communications.

BACKGROUND OF THE INVENTION

FIG. 10 shows a block diagram of conventional signal quality measuring schemes described in ["A Scheme for High Performance Real-Time BER Measurement", IEEE Trans. On Commun., Vol. 40, No. 10, October 1992 pp. 1574–1576].

In FIG. 10, the conventional signal quality measuring scheme consists of a signal detecting unit 101 for detecting and demodulating a received signal which is phase modulated, and outputting the signal as a signal point with phase information at a decision point such as a Nyquist point. The scheme further consists of, a phase region deciding section 102 for deciding to which phase region, of a plurality of different preset phase regions, the signal point outputted from the signal detecting section 101, namely the demodulated phase information corresponds. A counter section 103 counts a number of signal points in each phase region. A phase-distribution table storing section 106 stores a phase-distribution table representing a relation between a phase distribution probability in each phase region and a signal quality obtained by actual measurement or simulation or theoretical computation or the like. A likelihood calculating section 107 is provided for calculating a likelihood of phase distribution of each phase-distribution model obtained according to the count in the counter section 103, then detecting a phase distribution of the maximum likelihood phase-distribution model and outputting an estimated signal quality corresponding to that detected phase-distribution model.

The counter section 103 consists of a plurality of counter sections in region 1 to region M, 103-1, 103-2, . . . 103-M for counting the signal points outputted from the signal detecting section 101 for each of a plurality of different preset phase regions. Wherein M indicates a number of phase regions.

FIG. 11A shows a diagram representing a decision region for the phase distribution when a QPSK-modulated signal is received in the signal detecting section 101. In FIG. 11A, the upper right quadrant representing decision regions in phase distribution divided into four phase regions each having the same width assuming that a phase region closest to a phase $\pi/4$ is R1 of phases ($\pi/4$, $3\pi/4$, $-\pi/4$, $-3\pi/4$) demodulated in the signal detecting section 101 and that phase regions adjacent to the phase region $R_1$ are $R_2$, $R_3$, $R_4$ in this order. It should be noted that the phases $3\pi/4$, $-\pi/4$, $-3\pi/4$ can be represented in the upper left quadrant, in the lower left quadrant, and in the lower right quadrant respectively in the same manner as described above.

When a signal point, which is transmitted with the phase information $\pi/4$ and outputted from the signal detecting section 101, arrives through an ideal channel, then it is considered as $S_1$. This signal point is positioned on the central line of the phase region $R_1$, namely on the line indicating the phase $\pi/4$ in the upper right quadrant as shown in FIG. 11A. However, when there is a thermal noise or fading in the channel, the signal point which should originally indicate the phase information $\pi/4$ is displaced from the line indicating the phase $\pi/4$ like the point $S_2$. Especially, when the phase in this case is displaced by $\pi/4$ or more from the original signal point, then the signal point gets positioned in a different quadrant which results in a bit error.

Namely, in FIG. 11A, it is clear that a bit error rate (BER) and a signal-to-noise power ratio (noise power corresponding to a power of a 1-bit information signal: Eb/No) are high in order of the phase regions $R_1$, $R_2$, $R_3$, and $R_4$. By measuring a probability of a signal point falling in these phase regions (called "phase distribution probability" hereinafter), the bit error rate and signal-to-noise power ratio can be estimated.

The signal point outputted from the signal detecting section 101 can be obtained, for example, in the following manner. First, a relation between each phase distribution probability and a bit error rate or a signal-to-noise power ratio is measured, and then the bit error rate or the signal-to-noise power ratio of successively received signals is detected using a table indicating the relation. Any of these numerical values (estimated value) can be regarded as an estimated signal quality.

In the case described above, the counter section 103 has signal counter sections 103-1, 103-2, 103-3, and 103-4 each for counting a number of signal points falling in each phase regions $R_1$, $R_2$, $R_3$, and $R_4$ (namely, it is assumed that M is equal to four). As shown in FIG. 11A, when a signal point $S_1$ originally transmitted as a transmission signal but received as a signal point $S_2$ in the signal detecting section 101, it is decided by the phase region deciding section 102 that the signal point $S_2$ is in the phase region $R_2$, and the point is counted in the counter section in region 2, 103-2 corresponding to the phase region $R_2$.

As described above, when phase regions into which the signals received by the signal detecting section 101 in a specified measurement period fall is decided, and when number of points in each phase regions is counted, the phase distribution as shown in FIG. 11 can be obtained. The above mentioned phase distribution probability can be derived from this phase distribution.

Herein, it may be considered that a caller (a person who makes the communication) who is moving makes the communication through a fading channel while a caller who is standing still makes the communication through a Gaussian channel. The relation between the phase distribution probability and a bit error rate or the signal-to-noise power ratio is generally different depending on the channel condition during the communications. Thus, there may occur a problem that accurate bit error rate or accurate signal-to-noise power ratio can not be estimated simply by measuring the phase distribution probability.

In order to solve this problem, a phase-distribution table representing a relation between the phase distribution probability and the signal quality (such as the bit error rate or the signal-to-noise power ratio) is prepared for some of the typical channel models such as the fading channel or the Gaussian channel. This phase-distribution table is stored in the phase-distribution table storing section 106.

In practice, the phase-distribution table is a table that represents a relation between a phase distribution probability of each phase regions and the signal quality obtained by actual measurement or simulation or theoretical computation or the like.

The likelihood calculating section 107 refers to this phase-distribution table stored in the phase-distribution table storing section 106. Then the likelihood calculating section 107 calculates each likelihood of the phase distribution obtained from a result of counting by the counter section 103 corresponding to each phase-distribution model, detects a phase-distribution model whose posteriori probability is the maximum, namely the maximum likelihood phase-distribution model, and outputs an estimated signal quality corresponding to the detected phase-distribution model. In this case, the likelihood L (k) of the phase-distribution model k is obtained through the equation described below.

$$L(k) = \sum_{j=1}^{4} u_j v_{jk} + \lambda_k$$

Where count corresponding to four phase regions are $u_1$ to $u_4$ respectively, each logarithm of values corresponding to the phase regions of the phase-distribution model k in the phase-distribution table are $v_{1k}$ to $v_{4k}$, and the logarithm of normal probability of the phase-distribution model k is $\lambda_k$. However, the conventional signal quality measuring scheme estimates the signal quality by marking off a certain period of time having a continuous data, so that precision in estimation of the signal quality is decided by the duration of the time period (measurement period). Therefore, in order to obtain a sufficiently high precision in a low signal-to-noise power ratio, the measurement period is required to be taken sufficiently long. When the scheme is applied to an actual system, however, it is conceivable that a channel condition with time or data is received with bursts like TDMA (time division multiple access) communications. When the channel varies with time, and if a measurement period is too long, a response to time variation of the channel becomes worse, therefore precision in the estimation can not be enhanced. In case of data transaction with bursts like TDMA communications, when the signal quality is measured in the units of bursts, and if a burst size is small, precision in the estimation of the signal quality is reduced.

SUMMARY OF THE INVENTION

It is an object of the present invention to provide a signal quality measuring scheme which can realize a high estimation precision even in an actual system in which a channel varies in association with time by using a weighted average. Further, it is also an object of the present invention to provide a signal quality measuring scheme which can realize high precision estimation of the signal quality in a shorter measurement period by measuring the signal quality using not only the phase but also the amplitude of the signals.

A signal quality measuring scheme according to the present invention consists of a signal detecting unit for detecting and demodulating the received signals; a phase region deciding unit for deciding to which phase region of a plurality of different preset phase regions the signal point outputted from the signal detecting unit corresponds; a counter unit for counting a number of the output signal points corresponding to the phase region decided in the phase region deciding unit for each phase region in a specified period of time; a weighted average storing unit for storing a weighted average obtained by weighted average of the result of counting in the counter unit; a phase-distribution table storing unit for storing a table representing a relation between a phase distribution probability in each phase region and the signal quality for a plurality of different phase distribution models obtained by actual measurement or simulation or theoretical computation or the like; and a likelihood calculating unit for detecting the maximum likelihood phase-distribution model by calculating a likelihood of phase distribution of the received signals indicated by a weighted average for each phase region calculated in the weighted average calculating unit for each phase-distribution model using the phase-distribution table stored in the phase-distribution table storing unit, and outputting the signal quality corresponding to the detected phase-distribution model as an estimated signal quality of the received signals.

In the present invention, the phase region deciding unit decides in which phase region the signal point outputted from the signal detecting unit is included, the counter unit counts a number of the output signal points in the phase region for each phase region in a specified period of time, the weighted average calculating unit calculates a weighted average anew using the weighted average stored in the weighted average storing unit and a result of counting in the counter unit. The likelihood calculating unit detects the maximum likelihood phase-distribution model by calculating a likelihood of weighted averaged of the distribution as a result of calculation in the weighted average calculating unit using the phase-distribution table stored in the phase-distribution table storing unit for each phase-distribution model, and outputs the signal quality corresponding to the detected phase-distribution model as an estimated signal quality. Therefore, even if the time period for measurement of the signal quality is short, a result of measurement of signal points in the past can cumulatively be included by weighted average of the count of the signal points.

A signal quality measuring scheme according to another aspect of the present invention consists of, a signal detecting unit for detecting and demodulating the received signals; an amplitude region deciding unit for deciding to which amplitude region of a plurality of different preset amplitude regions the signal point outputted from the signal detecting unit corresponds; a counter unit for counting a number of the output signal points corresponding to the amplitude region decided in the amplitude region deciding unit for each amplitude region; an amplitude-distribution table storing unit for storing a table representing a relation between an amplitude distribution probability in each amplitude region and the signal quality for each of a plurality of different amplitude distribution models obtained by actual measurement or simulation or theoretical computation or the like; and a likelihood calculating unit for detecting the maximum likelihood amplitude-distribution model by calculating a likelihood of amplitude distribution of the received signals indicated by the count for each amplitude region counted in the counter unit for each amplitude-distribution model using the amplitude-distribution table stored in the amplitude-distribution table storing unit, and outputting the signal quality corresponding to the detected amplitude-distribution model as an estimated signal quality of the received signal.

In the present invention, the amplitude region deciding unit decides in which amplitude region the signal point outputted from the signal detecting unit is included, the counter unit counts a number of the output signal points in the each amplitude region and in a specified period of time. The likelihood calculating unit detects the maximum likelihood amplitude-distribution model by calculating a likelihood of amplitude distribution of the received signals as a result of calculation in the counter unit for each amplitude-distribution model using the amplitude-distribution table stored in the amplitude-distribution table storing unit, and outputs the signal quality corresponding to the detected amplitude-distribution model as an estimated signal quality. Therefore, when signals transmitted as continuous signals are received or even when discontinuous data is received in bursts, it is possible to estimate the signal quality by measuring the amplitude of the received signals.

A signal quality measuring scheme according to still another aspect of the present invention comprises, a signal detecting unit for detecting and demodulating the received signals; an amplitude region deciding unit for deciding to which amplitude region of a plurality of different preset amplitude regions the signal point outputted from the signal detecting unit corresponds; a counter unit for counting a number of the output signal points corresponding to the amplitude region decided in the amplitude region deciding unit for each amplitude region; a weighted average storing unit for storing a weighted average obtained by weighted average of counting in the counter unit; an amplitude-distribution table storing unit for storing a table representing a relation between an amplitude distribution probability in each amplitude region and the signal quality for each of a plurality of different amplitude distribution models obtained by actual measurement or simulation or theoretical computation or the like; and a likelihood calculating unit for detecting the maximum likelihood amplitude-distribution model by calculating a likelihood of amplitude distribution of the received signals indicated by a weighted average for each amplitude region calculated in the weighted average calculating unit for each amplitude-distribution model using the amplitude-distribution table stored in the amplitude-distribution table storing unit, and outputting the signal quality corresponding to the detected amplitude-distribution model as an estimated signal quality of the received signals.

In the present invention, the amplitude region deciding unit decides in which amplitude region the signal point outputted from the signal detecting unit is included, the counter unit counts a number of the output signal points in the each amplitude region and in a specified period of time, the weighted average calculating unit calculates a weighted average anew using the weighted average stored in the weighted average storing unit and a result of counting in the counter unit. Then the likelihood calculating unit detects the maximum likelihood amplitude-distribution model by calculating a likelihood of amplitude distribution weighted average as a result of calculation in the weighted average calculating unit for each amplitude-distribution model using the amplitude-distribution table stored in the amplitude-distribution table storing unit, and outputs the signal quality corresponding to the detected amplitude-distribution model as an estimated signal quality Therefore, even if a time period for measurement of the signal quality is short, a result of measurement of signal points in the past can cumulatively be included by weighted average of the count of the signal points, and also signal quality can be estimated by measuring the amplitude of the received signals.

A signal quality measuring scheme according to still another aspect of the present invention comprises, a signal detecting unit for detecting and demodulating the received signals; a phase/amplitude region deciding unit for deciding to which phase/amplitude region of a plurality of different phase/amplitude regions preset on a phase/amplitude plane the signal point outputted from the signal detecting unit corresponds; a counter unit for counting a number of the output signal points corresponding to the phase/amplitude region decided in the phase/amplitude region deciding unit for each phase/amplitude region; a phase/amplitude-distribution table storing unit for storing a table representing a relation between a phase/amplitude distribution probability in each phase/amplitude region and the signal quality of different phase/amplitude distribution models obtained by actual measurement or simulation or theoretical computation or the like; and a likelihood calculating unit for detecting the maximum likelihood phase/amplitude-distribution model by calculating a likelihood of phase/amplitude distribution of the received signals indicated by the count for each phase/amplitude region counted in the counter unit for each phase/amplitude-distribution model using the phase/amplitude-distribution table stored in the phase/amplitude-distribution table storing unit, and outputting signal quality corresponding to the detected phase/amplitude-distribution model as an estimated signal quality of the received signals.

In the present invention, the phase/amplitude region deciding unit decides in which phase/amplitude region the signal point outputted from the signal detecting unit is included, the counter unit counts a number of the output signal points in the phase/amplitude region for each phase/amplitude region and in a specified period of time. Then the likelihood calculating unit detects the maximum likelihood phase/amplitude-distribution model by calculating a likelihood of phase/amplitude distribution of the received signals as a result of calculation in the counter unit for each phase/amplitude-distribution model using the phase/amplitude-distribution table stored in the phase/amplitude-distribution table storing unit, and outputs the signal quality corresponding to the detected phase/amplitude-distribution model as an estimated signal quality. Therefore, when signals transmitted as continuous signals are received or even when discontinuous data is received in bursts, it is possible to estimate the signal quality considering both the displacement of phase information and the variation in strength of the received signals.

A signal quality measuring scheme according to still another aspect of the present invention comprises, a signal detecting unit for detecting and demodulating the received signals; a phase/amplitude region deciding unit for deciding to which phase/amplitude region of a plurality of different preset phase/amplitude regions on a phase/amplitude plane the signal point outputted from the signal detecting unit corresponds; a counter unit for counting a number of the output signal points corresponding to the phase/amplitude region decided in the phase/amplitude region deciding unit for each phase/amplitude region; a weighted average storing unit for storing a weighted average obtained by weighted average of the result of counting in the counter unit; a weighted average calculating unit for calculating a weighted average anew using the weighted average stored in the weighted average storing unit as well as the result of counting in the counter unit; a phase/amplitude-distribution table storing unit for storing a table representing a relation between a phase/amplitude distribution probability in each phase/amplitude region and the signal quality of different phase/amplitude distribution models obtained by actual measurement or simulation or theoretical computation or the like; and a likelihood calculating unit for detecting the maximum likelihood phase/amplitude-distribution model by calculating a likelihood of phase/amplitude distribution of the received signals indicated by a weighted average for each phase/amplitude region calculated in the weighted average calculating unit for each phase/amplitude-distribution model using the phase/amplitude-distribution table stored in the phase/amplitude-distribution table storing unit, and outputting the signal quality corresponding to the detected phase/amplitude-distribution model as an estimated signal quality of the received signals.

In the present invention, the phase/amplitude region deciding unit decides in which phase/amplitude region the signal point outputted from the signal detecting unit is included, the counter unit counts a number of the output signal points in the phase/amplitude region and in a specified period of time, the weighted average calculating unit calculates a weighted average anew using a weighted average stored in the weighted average storing unit as well as a result of counting in the counter unit. Then the likelihood calculating unit detects the maximum likelihood phase/amplitude-distribution model by calculating a likelihood of weighted averaged phase/amplitude distribution as a result of calculation in the weighted average calculating unit for each phase/amplitude-distribution model using the phase/amplitude-distribution table stored in the phase/amplitude-distribution table storing unit, and outputs the signal quality corresponding to the detected phase/amplitude-distribution model as an estimated signal quality. Therefore, even if a time period for measurement of the signal quality is short, a result of measurement of signal points in the past can cumulatively be included by weighted average of the counts of the signal points, and also signal quality can be estimated considering both the displacement of phase information and the variation in strength of the received signals.

A signal quality measuring scheme according to the present invention further comprises, a channel information storing unit for storing channel model information corresponding to the phase-distribution model or the amplitude-distribution model or the phase/amplitude-distribution model detected by the likelihood calculating unit; wherein the likelihood calculating unit selects a higher likelihood phase-distribution model according to the channel model information stored in the channel information storing unit and decides the signal quality for the selected model as an estimated value.

In the present invention, the channel information storing unit stores channel mode information corresponding to the phase distribution model or the amplitude distribution model or the phase/amplitude-distribution model detected by the likelihood calculating unit, and the likelihood calculating unit selects a higher likelihood phase/amplitude-distribution model according to the channel model information in the past stored in the channel information storing unit and decides the signal quality for the selected model as an estimated value. Therefore, when an estimated value is outputted, a higher likelihood estimated value can be obtained by referring to the channel information detected in the past.

A signal quality measuring scheme according to still another aspect of the present invention comprises, a signal detecting unit for detecting and demodulating the received signals; a phase region deciding unit for deciding to which phase region of a plurality of different preset phase regions the signal point outputted from the signal detecting unit corresponds; a first counter unit for counting a number of the output signal points corresponding to the phase region decided in the phase region deciding unit for each phase region in a specified period of time; a phase-distribution table storing unit for storing a table representing a relation between a phase distribution probability in each phase region and the signal quality for each different phase distribution models obtained by actual measurement or simulation or theoretical computation or the like; a first likelihood calculating unit for detecting the maximum likelihood phase-distribution model by calculating a likelihood of phase distribution of the received signals indicated by the count for each phase region counted in the first counter unit for each phase-distribution model using the phase-distribution table stored in the phase-distribution table storing unit, and outputting the signal quality corresponding to the detected phase-distribution model as an estimated signal quality of the received signals; an amplitude region deciding unit for deciding to which amplitude region of a plurality of different preset amplitude regions the signal point outputted from the signal detecting unit corresponds; a second counter unit for counting a number of the output signal points corresponding to the amplitude region decided in the amplitude region deciding unit for each amplitude region; an amplitude-distribution table storing unit for storing in a table representing a relation between an amplitude distribution probability in each amplitude region and the signal quality of different amplitude distribution models obtained by actual measurement or simulation or theoretical computation or the like; a second likelihood calculating unit for detecting the maximum likelihood amplitude-distribution model by calculating a likelihood of amplitude distribution of the received signals indicated by a count for each amplitude region counted in the second counter unit for each amplitude-distribution model using the amplitude-distribution table stored in the amplitude-distribution table storing unit, and outputting the signal quality corresponding to the detected amplitude-distribution model as an estimated signal quality of the received signals; and an estimated-value selecting unit for comparing the likelihood of the maximum likelihood phase-distribution model calculated in the first likelihood calculating unit with the likelihood of the maximum likelihood amplitude-distribution model calculated in the second likelihood calculating unit and then deciding the estimated value calculated in either the first likelihood calculating unit or the second likelihood calculating unit as an estimated signal quality of the received signals.

In the present invention, the phase region deciding unit decides in which phase region the signal point outputted from the signal detecting unit is included, the first counter unit counts a number of the output signal points in the phase region for each phase region and in a specified period of time. The first likelihood calculating unit detects the maximum likelihood phase-distribution model by calculating a likelihood of phase distribution of the received signals as a result of calculation in the first counter unit for each phase-distribution model using the phase-distribution table stored in the phase-distribution table storing unit, and outputs the signal quality corresponding to the detected phase-distribution model as an estimated signal quality. The amplitude region deciding unit decides in which amplitude region the signal point outputted from the signal detecting unit is included, the second counter unit counts a number of the output signal points in the amplitude region and in a specified period time. The second likelihood calculating unit detects the maximum likelihood amplitude-distribution model by calculating a likelihood of amplitude distribution of the received signals as a result of calculation in the second counter unit for each amplitude-distribution model using the amplitude-distribution table stored in the amplitude-distribution table storing unit, and outputs the signal quality corresponding to the detected amplitude-distribution model as an estimated signal quality. Finally, the estimated-value selecting unit compares the maximum likelihood outputted by the first likelihood calculating unit and that outputted by the second likelihood calculating unit and then outputs the estimated value calculated in either the first likelihood calculating unit or the second likelihood calculating unit as an estimated signal quality. Therefore, signal quality of a higher likelihood channel can be estimated considering both the displacement of phase information and the variation in strength of the received signals.

A signal quality measuring scheme according to still another aspect of the present invention comprises, a signal detecting unit for detecting and demodulating the received signals; a phase region deciding unit for deciding to which phase region of a plurality of different preset phase regions the signal point outputted from the signal detecting unit corresponds; a first counter unit for counting a number of the output signal points corresponding to the phase region decided in the phase region deciding unit for each phase region in a specified period of time; a first weighted average storing unit for storing in a weighted average obtained by weighted average of the result of counting in the first counter unit; a phase-distribution table storing unit for storing in a table representing a relation between a phase distribution probability in each phase region and the signal quality of each different phase distribution models obtained by actual measurement or simulation or theoretical computation or the like; a first likelihood calculating unit for detecting the maximum likelihood phase-distribution model by calculating a likelihood of phase distribution of the received signals indicated by a weighted average for each phase region calculated in the weighted average calculating unit for each phase-distribution model using the phase-distribution table stored in the phase-distribution table storing unit, and outputting the signal quality corresponding to the detected phase-distribution model as an estimated signal quality of the received signals; an amplitude region deciding unit for deciding to which amplitude region of a plurality of different preset amplitude regions the signal point outputted from the signal detecting unit corresponds; a second counter unit for counting a number of the output signal points corresponding to the amplitude region decided in the amplitude region deciding unit for each amplitude region; a second weighted average storing unit for storing in a weighted average obtained by weighted average of a result of counting in the second counter unit; an amplitude-distribution table storing unit for storing in a table representing a relation between an amplitude distribution probability in each amplitude region and the signal quality of each different amplitude distribution models obtained by actual measurement or simulation or theoretical computation or the like; a second likelihood calculating unit for detecting the maximum likelihood amplitude-distribution model by calculating a likelihood of amplitude distribution of the received signals indicated by a weighted average for each amplitude region calculated in the weighted average calculating unit for each amplitude-distribution model using the amplitude-distribution table stored in the amplitude-distribution table storing unit, and outputting the signal quality corresponding to the detected amplitude-distribution model as an estimated signal quality of the received signals; and an estimated-value selecting unit for comparing the likelihood of the maximum likelihood phase-distribution model calculated in the first likelihood calculating unit with the degree of the maximum likelihood amplitude-distribution model calculated in the second likelihood calculating unit and then deciding the estimated value calculated in either the first likelihood calculating unit or the second likelihood calculating unit as an estimated signal quality of the received signals.

In the present invention, the phase region deciding unit decides in which phase region the signal point outputted from the signal detecting unit is included, the first counter unit counts a number of the output signal points in the phase region for each phase region and in a specified period of time, the first weighted average calculating unit calculates a weighted average anew using the weighted average stored in the first weighted average storing unit and a result of counting in the first counter unit. The first likelihood calculating unit detects the maximum likelihood phase-distribution model by calculating a likelihood of weighted averaged phase distribution as a result of calculation in the first weighted average calculating unit for each phase-distribution model using the phase-distribution table stored in the phase-distribution table storing unit, and outputs the signal quality corresponding to the detected phase-distribution model as an estimated signal quality. The amplitude region deciding unit decides in which amplitude region the signal point outputted from the signal detecting unit is included, the second counter unit counts a number of the output signal points in the amplitude region for each amplitude region and in a specified period of time, the second weighted average calculating unit calculates a weighted average anew using the weighted average stored in the second weighted average storing unit and a result of counting in the second counter unit. The second likelihood calculating unit detects the maximum likelihood amplitude-distribution model by calculating a likelihood of weighted average of amplitude distribution as a result of calculation in the second weighted average calculating unit for each amplitude-distribution model using the amplitude-distribution table stored in the amplitude-distribution table storing unit, and outputs a signal quality corresponding to the detected amplitude-distribution model as an estimated signal quality. Finally, the estimated-value selecting unit compares the maximum likelihood phase-distribution model calculated in the first likelihood calculating unit and that calculated in the second likelihood calculating unit and then outputs the estimated value calculated in either the first likelihood calculating unit or the second likelihood calculating unit as an estimated signal quality. Therefore, even if a time period for measurement of the signal quality is short, a result of measurement of signal points in the past can cumulatively be included by weighted average of the counts of the signal points, and also signal quality of a higher likelihood channel can be estimated considering both the displacement of phase information and the variation in strength of the received signals.

A signal quality measuring scheme according to the present invention further comprises, a channel information storing unit for storing channel model information corresponding to the phase-distribution model and the amplitude-distribution model each detected by the first likelihood calculating unit and the second likelihood calculating unit respectively; wherein the estimated-value selecting unit outputs the estimated value calculated in either the first likelihood calculating unit or the second likelihood calculating unit as an estimated signal quality of the received signals according to the channel model information stored in the channel information storing unit.

In the present invention, the channel information storing unit stores channel model information corresponding to the phase-distribution model and amplitude-distribution model each detected by the likelihood calculating units, and the estimated-value selecting unit outputs the estimated signal quality according to the channel model information in the past stored in the channel information storing unit. Therefore, when an estimated value is outputted, a higher likelihood estimated value can be selected by referring to the information for channel detected in the past.

In a signal quality measuring scheme according to another aspect of the present invention, an estimated signal quality of the received signal is the bit error rate (BER).

In the present invention, bit error rate which indicates the frequency of occurrence of the bit error in the received signals is used as an estimated signal quality.

In a signal quality measuring scheme according to another aspect of the present invention, an estimated signal quality of the received signal is the signal-to-noise power ratio (Eb/No).

In the present invention, signal-to-noise power ratio which indicates the proportion of the signal power for 1-bit information of a received signal with respect to the noise power is used as an estimated signal quality.

Other objects and features of this invention will become apparent from the following description with reference to the accompanying drawings.

BRIEF DESCRIPTION OF THE DRAWINGS

FIG. 11A is a diagram showing a decision region for phase distribution and FIG. 11B is an explanatory view showing the phase distribution.

DESCRIPTION OF THE PREFERRED EMBODIMENTS

Detailed description is made hereinafter for embodiments of the signal quality measuring scheme according to the present invention with reference to the related drawings.

Figure 1:
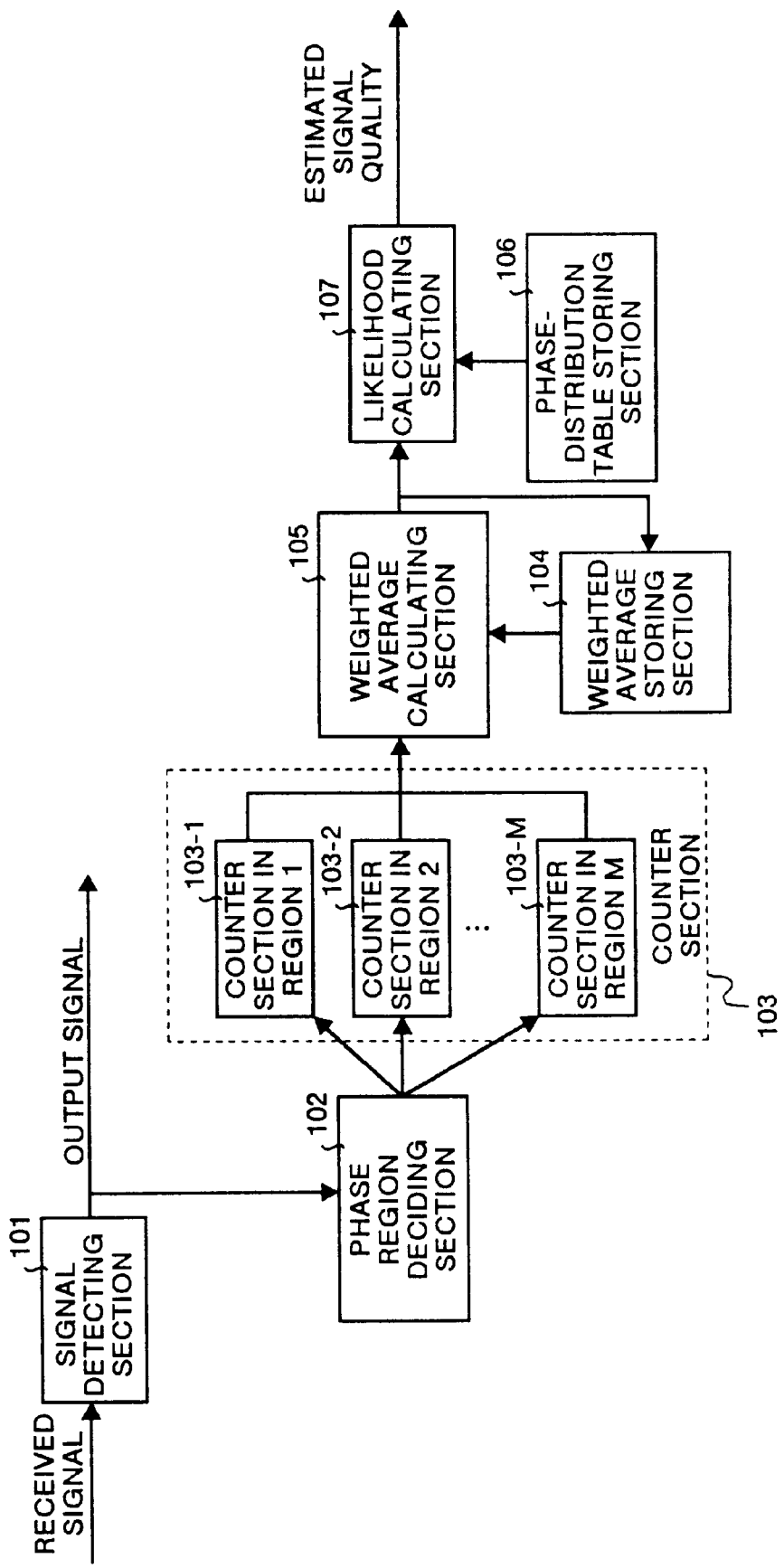
FIG. 1 is a block diagram showing general configuration of a signal quality measuring scheme according to Embodiment 1.
Figure 10:
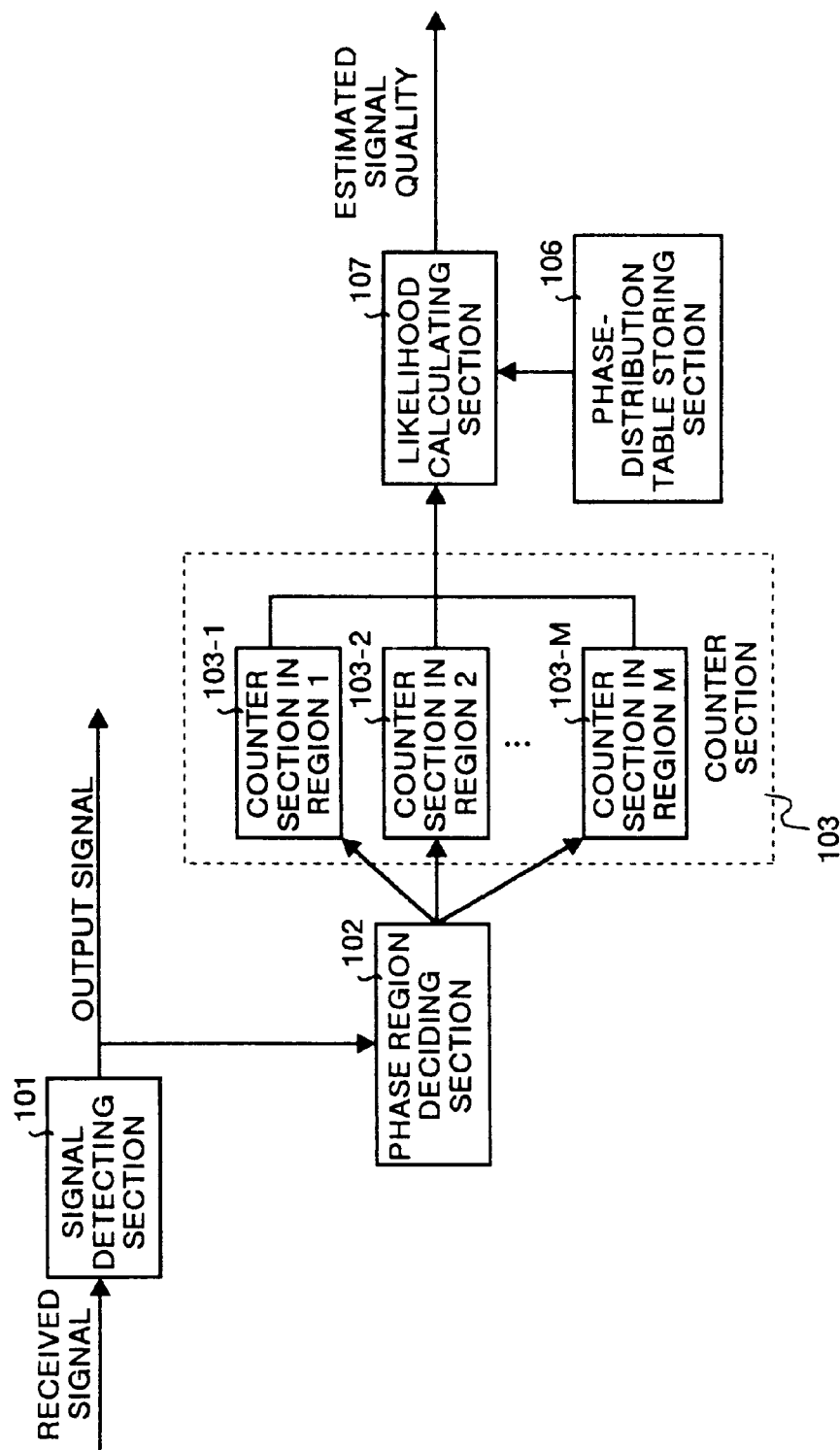
FIG. 10 is a block diagram showing the conventional signal quality measuring scheme.

FIG. 1 is a block diagram showing general configuration of a signal quality measuring scheme according to Embodiment 1. It should be noted that the same reference numerals are assigned to the sections common to those in FIG. 10, and these descriptions are omitted. The signal quality measuring scheme according to Embodiment 1 shown in FIG. 1 is different from the conventional signal quality measuring scheme shown in FIG. 10 in a point that the scheme according to Embodiment 1 includes a weighted average calculating section 105 for calculating a weighted average from a result of counting outputted from the counter section 103 and a weighted average storing section 104 for storing the weighted average calculated in the weighted average calculating unit 105.

Here, as an example, a case in which the phase region is divided into four regions $R_1$, $R_2$, $R_3$, and $R_4$ as shown in FIG. 11A will be described and the signal quality will be measured for each burst assuming that TDMA communications are carried out based on QPSK modulation.

Figure 2:
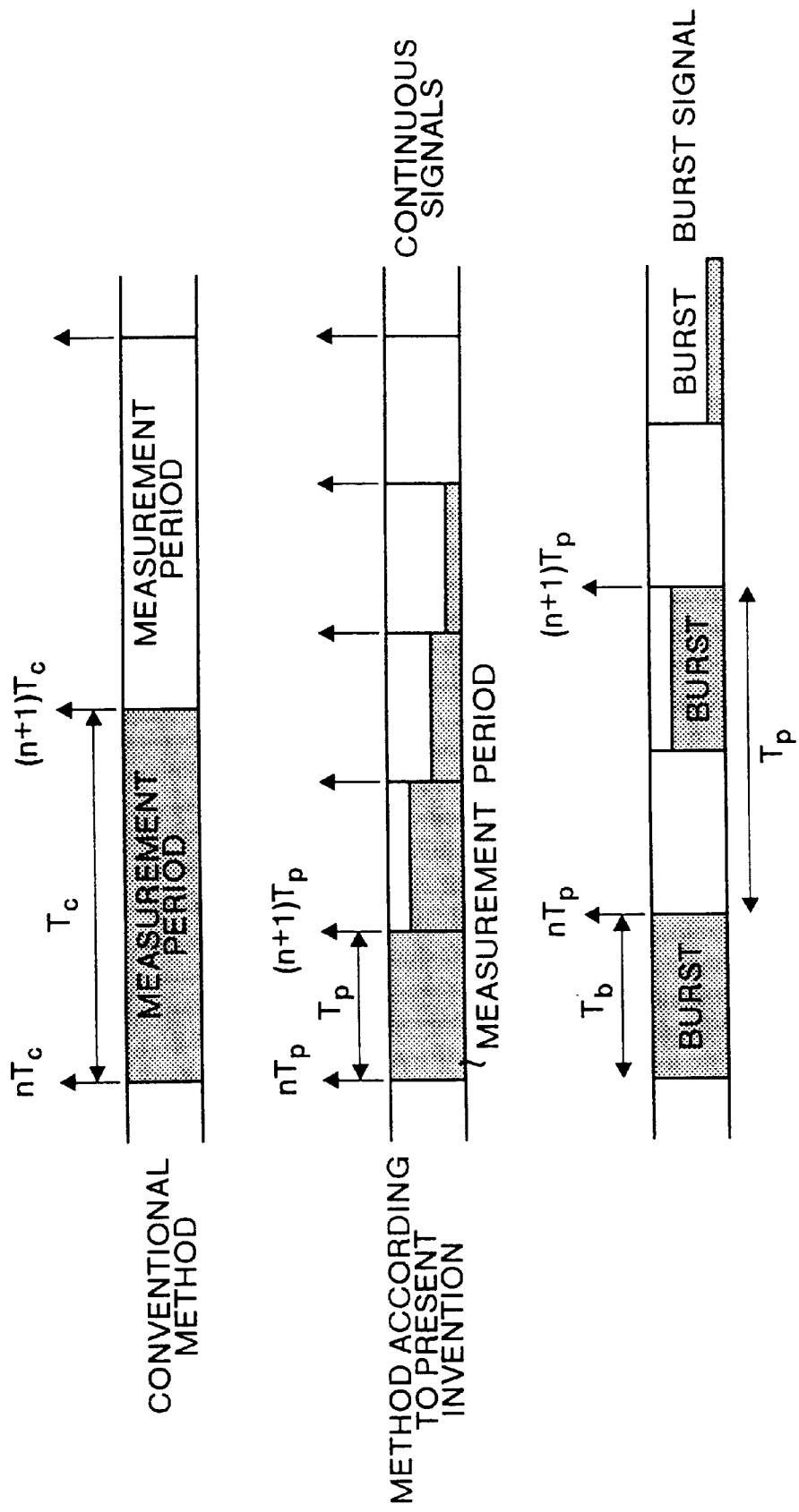
FIG. 2 is a view comparing the measurement period of the present invention to that in the conventional method.

FIG. 2 is a view comparing the measurement period of the present invention to that of the conventional method. In FIG. 2, a first transmitted signal for a burst to be measured is the signal point $S_1$ shown in FIG. 11A, and assuming that this signal point is received as the signal point $S_2$ in the signal detecting section 101, it is decided by the phase region deciding section 102 that this signal point $S_2$ corresponds to the phase region $R_2$, and the signal point is counted by the counter section in region 2 103-2 corresponding to the region $R_2$. By measuring and counting the number of signal points in each phase regions for all of the received signals each with a burst size $T_b$ in the same manner, the counter section 103 calculates phase distribution of the received signal points for the burst in the time $nT_p$.

When the counting is over, the weighted average calculating section 105 calculates the weighted average at the timing $(n-1)T_p$ stored in the weighted average storing section 104, namely the phase distribution weighted average and calculated by the weighted average calculating section 105 in the previous time is weighted averaged to the phase distribution at the timing $nT_p$ as output from the counter section 103. More specifically, assuming that the count of phase distribution in the phase region $R_1$ at the timing $nT_p$ is $u_j[nT_p]$ and an forgetting factor is $\alpha$ ($0 \leq \alpha \leq 1$), the weighted average calculating section 105 calculates a count $u_j[nT_p]$ after the weighted average according to the following equation.

$$U_j[nT_p] = u_j[nT_p] + \alpha U_j[(n-1)T_p]$$

Then, the phase distribution after the weighted average at the timing $nT_p$ as output from the weighted average calculating section 105 is stored in the weighted average storing section 104. The weighted average is stored in order to use this value as the previous weighted average, namely as a weighted average of the phase distribution at the timing $(n+1)T_p$ in the following calculation of the weighted average.

The likelihood calculating section 107 receives the weighted average of phase distribution outputted from the weighted average calculating section 105. Then, the likelihood calculating section 107 refers to the phase-distribution table stored in the phase-distribution table storing section 106, calculates the likelihood of the weighted average of phase distribution corresponding to each of phase-distribution models, detects a phase-distribution model whose posteriori probability is the maximum, namely detects the maximum likelihood phase-distribution model, and outputs the signal quality corresponding to the detected phase-distribution model as an estimated signal quality. In this case, the likelihood L(k) of the phase-distribution model k is obtained using the count $U_j[nT_p]$ after the weighted average according to the following equation.

$$L(k) = \sum_{j=1}^{4} U_j[nT_p] v_{jk} + \lambda_k$$

Where count corresponding to four phase regions are $u_1$ to $u_4$ respectively, each logarithm of values corresponding to the phase regions of the phase-distribution model k in the phase-distribution table are $v_{1k}$ to $v_{4k}$, and the logarithm of normal probability of the phase-distribution model k is $\lambda_k$.

Figure 3:
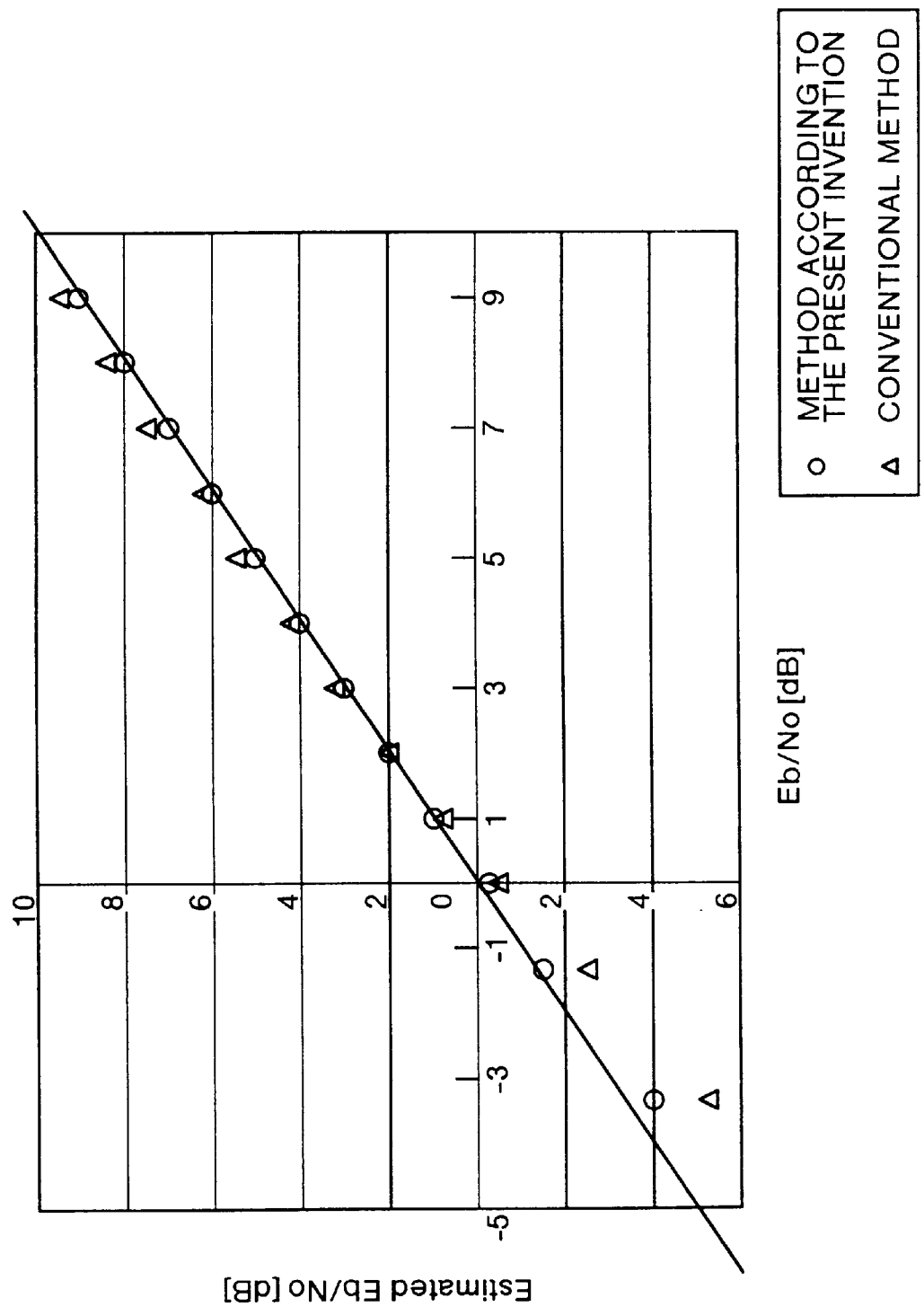
FIG. 3 is a graph of outputted signal-to-noise power ratio (Eb/No) as an estimated value with an actual Eb/No.

FIG. 3 is a graph for explaining matching of a signal-to-noise power ratio (Eb/No) outputted as an estimated value with an actual Eb/No. FIG. 3 shows a result of estimation of the signal-to-noise power ratio (Eb/No) by computer simulation when the scheme has phase-distribution tables corresponding to two channel models of a Gaussian channel and a rice fading channel (a rice factor 7 dB, Doppler frequency 200 Hz) assuming that QPSK modulation is used and the number of phase regions is four. It is clear from FIG. 3 that the estimated value calculated by the signal quality measuring scheme according to the present invention matches better with the actual Eb/No as compared to the estimated value calculated in the conventional signal quality measuring scheme which indicates that the signal quality has been accurately estimated.

When measurement precision of signal quality in the conventional signal quality measuring scheme is tried to be enhanced, it is required to make the measurement period $T_c$ indicated by the time $nT_c \sim (n+1)nT_c$ longer for signals transmitted as continuous signals. However, as described above, with the signal quality measuring scheme according to Embodiment 1, as shown in FIG. 2, even when the measurement period $T_p$ indicated by the time $nT_p \sim (n+1)nT_p$ is short, a result of measurement of signal points in the past can cumulatively be included because the weighted average calculating section 105 and the weighted average storing section 104 are provided. Therefore, signal quality can be measured with a high precision.

When a channel varies with time, especially even when discontinuous data transaction is performed by burst, high-precision measurement of signal quality can easily be carried out for each burst even if the burst size is small.

Figure 4:
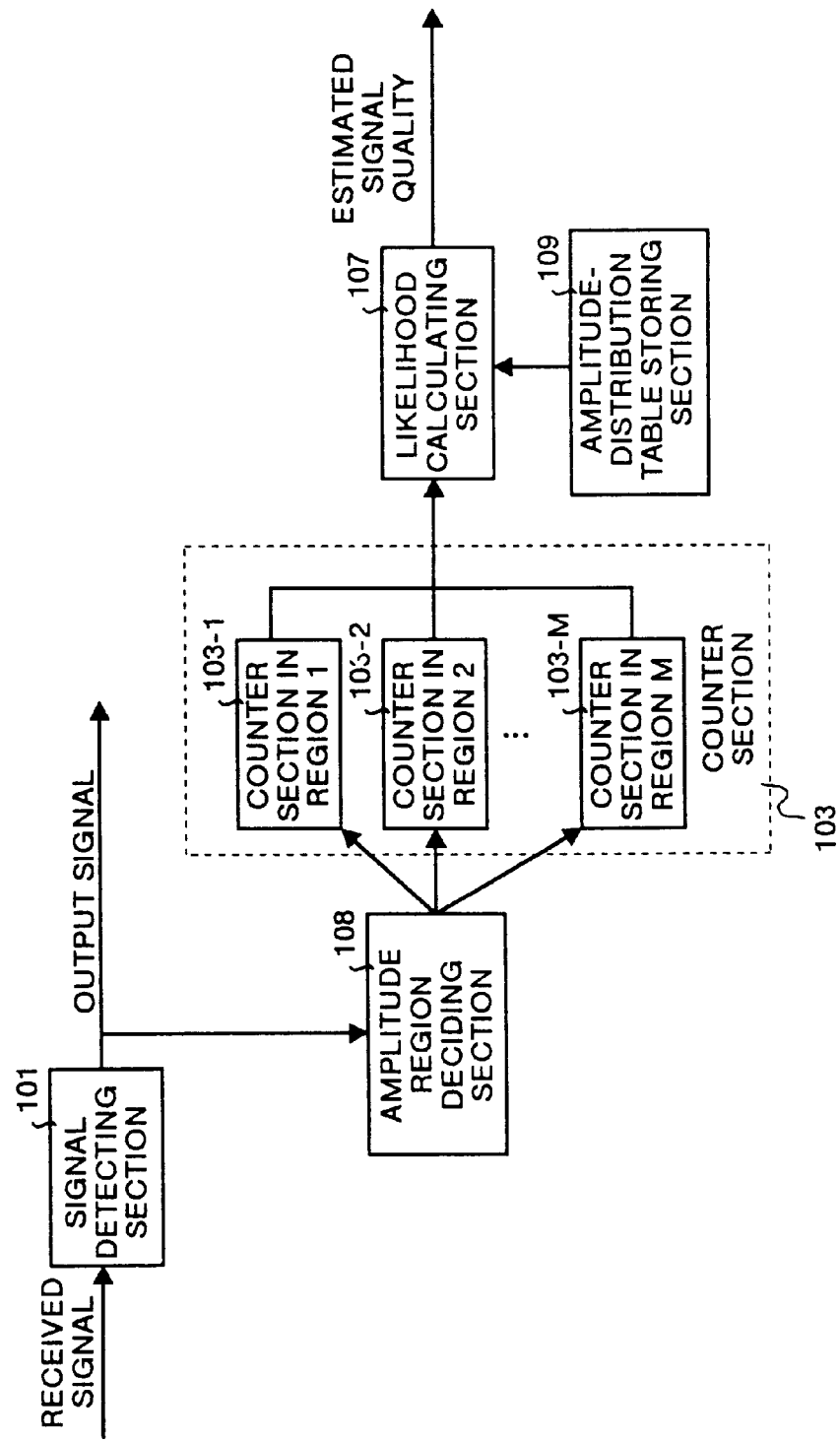
FIG. 4 is a block diagram showing general configuration of a signal quality measuring scheme according to Embodiment 2.

Next, a signal quality measuring scheme according to Embodiment 2 will be described. FIG. 4 is a block diagram showing general configuration of the signal quality measuring scheme according to Embodiment 2. It should be noted that the same reference numerals are assigned to the sections common to those in FIG. 10, and these descriptions thereof are omitted. The signal quality measuring scheme according to Embodiment 2 shown in FIG. 4 is different from the conventional signal quality measuring scheme shown in FIG. 10 in a point that the scheme according to Embodiment 2 comprises an amplitude region deciding section 108 in place of the phase region deciding section 102 in FIG. 10 and an amplitude-distribution table storing section 109 in place of the phase-distribution table storing section 106.

Figure 5:
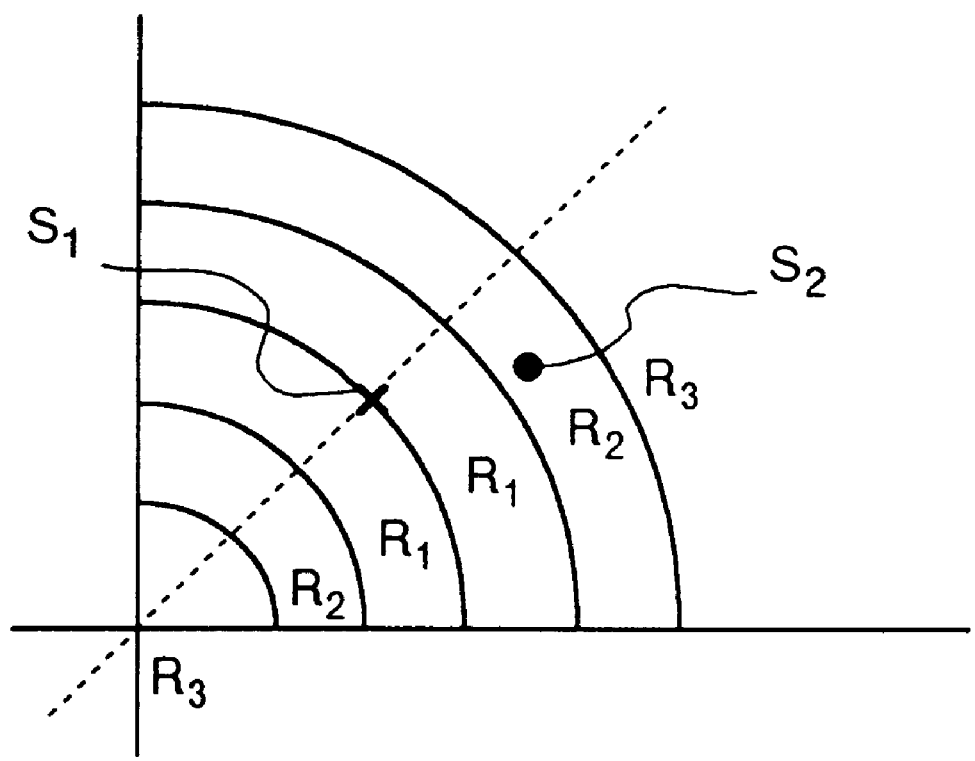
FIG. 5 is a diagram showing a decision region for amplitude distribution when a QPSK-modulated signal is demodulated in a signal detecting section.

FIG. 5 is a diagram showing a decision region for amplitude distribution when a QPSK-modulated signal is modulated in the signal detecting section 101. FIG. 5 especially shows a decision region for the amplitude of a signal point demodulated in the signal detecting section 101 as phase information $\pi/4$, and is referred to for deciding to which of the amplitude regions ($R_1$, $R_2$, $R_3$) obtained by dividing the region into three types the signal point corresponds. As for the signal points demodulated as phase information $3\pi/4$, $-\pi/4$, $-3\pi/4$, similar amplitude decision regions are present in the upper left quadrant, in the lower left quadrant, and in the lower right quadrant respectively.

Herein, when a received signal showing the phase information $\pi/4$ arrives through an ideal channel and a signal point outputted from the signal detecting section 101 is $S_1$, it is assumed that the signal point $S_1$ positions on the border between two amplitude regions $R_1$ as shown in FIG. 5. Namely, in FIG. 5, it is regarded that the bit error rate and signal-to-noise power ratio are higher in order of the amplitude regions $R_1$, $R_2$, and $R_3$.

The counter section 103 comprises counter sections in region 1, 2 and 3 103-1, 103-2, and 103-3 for counting a number of signal points corresponding to phase regions in correlation to the amplitude regions $R_1$, $R_2$, and $R_3$ respectively (namely, it is assumed that M is equal to three). As shown in FIG. 5, when the signal point $S_1$ is transmitted as a transmission signal and is received as the signal point $S_2$ in the signal detecting section 101, it is decided by the amplitude region deciding section 108 that this signal point $S_2$ is in the amplitude region $R_2$, and the point is counted by the counter section in region 2 103-2 corresponding to the amplitude region $R_2$.

As described above, amplitude distribution is obtained by deciding each amplitude region for all the signals received by the signal detecting section 101 in a prespecified time period and by counting the number of signal points in each of the amplitude regions. Amplitude distribution probability similar to the above mentioned phase distribution probability can be derived from this amplitude distribution.

The amplitude-distribution table storing section 109 stores amplitude-distribution tables each showing a correlation between amplitude distribution probability and signal quality for some of the channel models such as the fading channel or the Gaussian channel in the same manner as the phase-distribution table storing section 106.

Herein, similarly to the case of phase-distribution table, in the actual case, the amplitude-distribution table has tables each representing a relation between each amplitude distribution probability and the signal quality by actual measurement or simulation or theoretical computation or the like.

Then, the likelihood calculating section 107 refers to the amplitude-distribution table stored in the amplitude-distribution table storing section 109, calculates each likelihood of the amplitude distribution obtained from a result of counting by the counter section 103 corresponding to each amplitude-distribution model using an equation with which the count value after the weighted average is calculated respectively, detects the maximum likelihood amplitude-distribution model, and outputs the signal quality corresponding to the detected amplitude-distribution model as an estimated signal quality.

As described above, with the signal quality measuring scheme according to Embodiment 2, as the scheme comprises the amplitude region deciding section 108 and amplitude-distribution table storing section 109, when signals transmitted as continuous signals are received or even when discontinuous data is received in bursts as shown in FIG. 2, it is possible to estimate the signal quality of a channel from the strength of the received signal, namely by measuring the amplitude of the received signal.

It should be noted that, by inserting the weighted average calculating section 105 and weighted average storing section 104 each described in Embodiment 1 in between the counter section 103 and likelihood calculating section 107 and obtaining amplitude distribution using the count after the weighted average, the same effects as those in Embodiment 1 can also be obtained.

Figure 6:
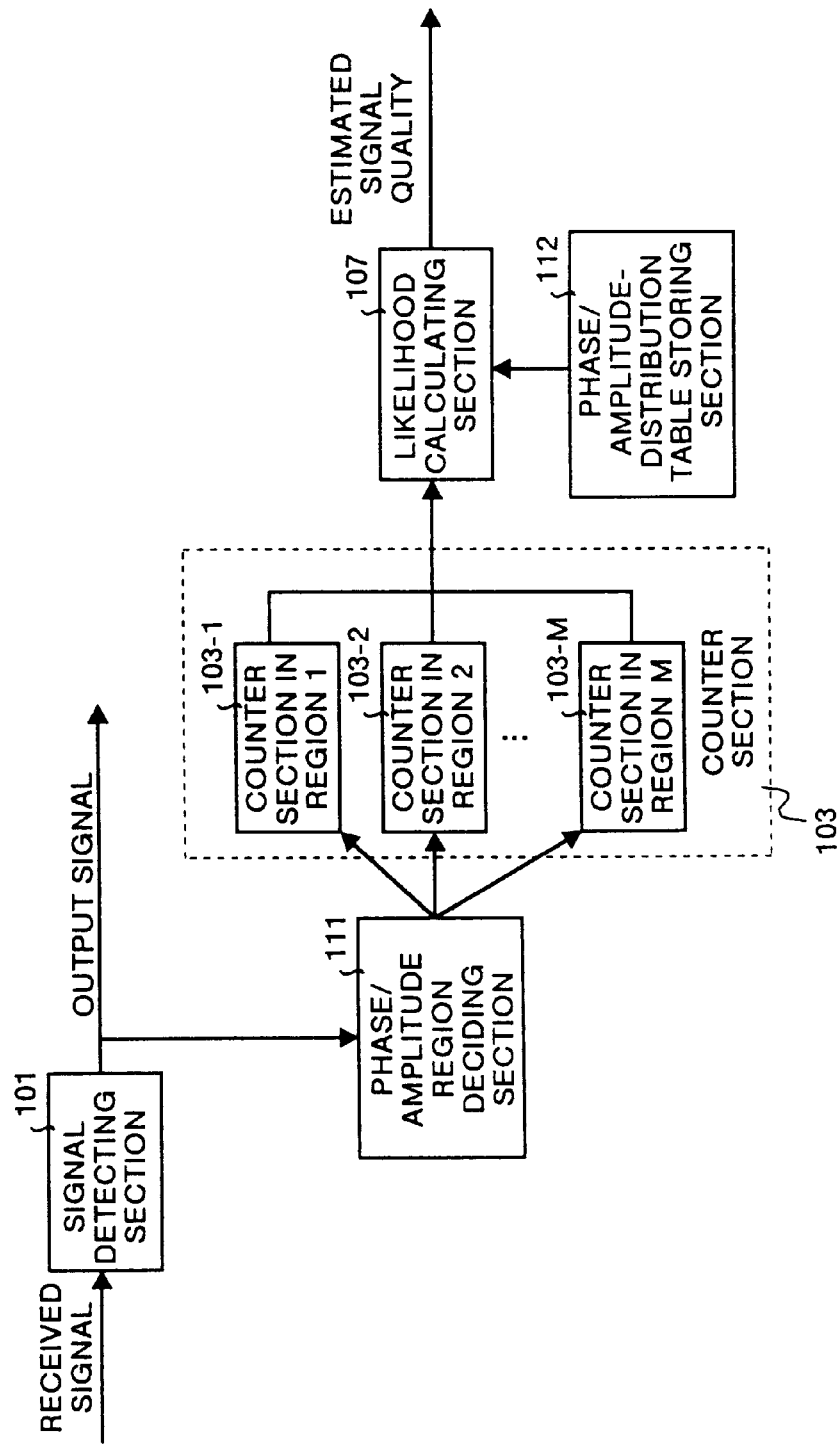
FIG. 6 a block diagram showing general configuration of a signal quality measuring scheme according to Embodiment 3.

Next, a signal quality measuring scheme according to Embodiment 3 will be described. FIG. 6 is a block diagram showing general configuration of the signal quality measuring scheme according to Embodiment 3. It should be noted that the same reference numerals are assigned to the sections common to those in FIG. 10, and these descriptions are omitted. The signal quality measuring scheme according to Embodiment 3 shown in FIG. 6 is different from the conventional signal quality measuring scheme shown in FIG. 10 in a point that the scheme according to Embodiment 3 comprises a phase/amplitude region deciding section 111 in place of the phase region deciding section 102 in FIG. 10 and a phase/amplitude-distribution table storing section 112 in place of the phase-distribution table storing section 106. The term "phase/amplitude" as used herein means both phase and amplitude regions.

Figure 7:
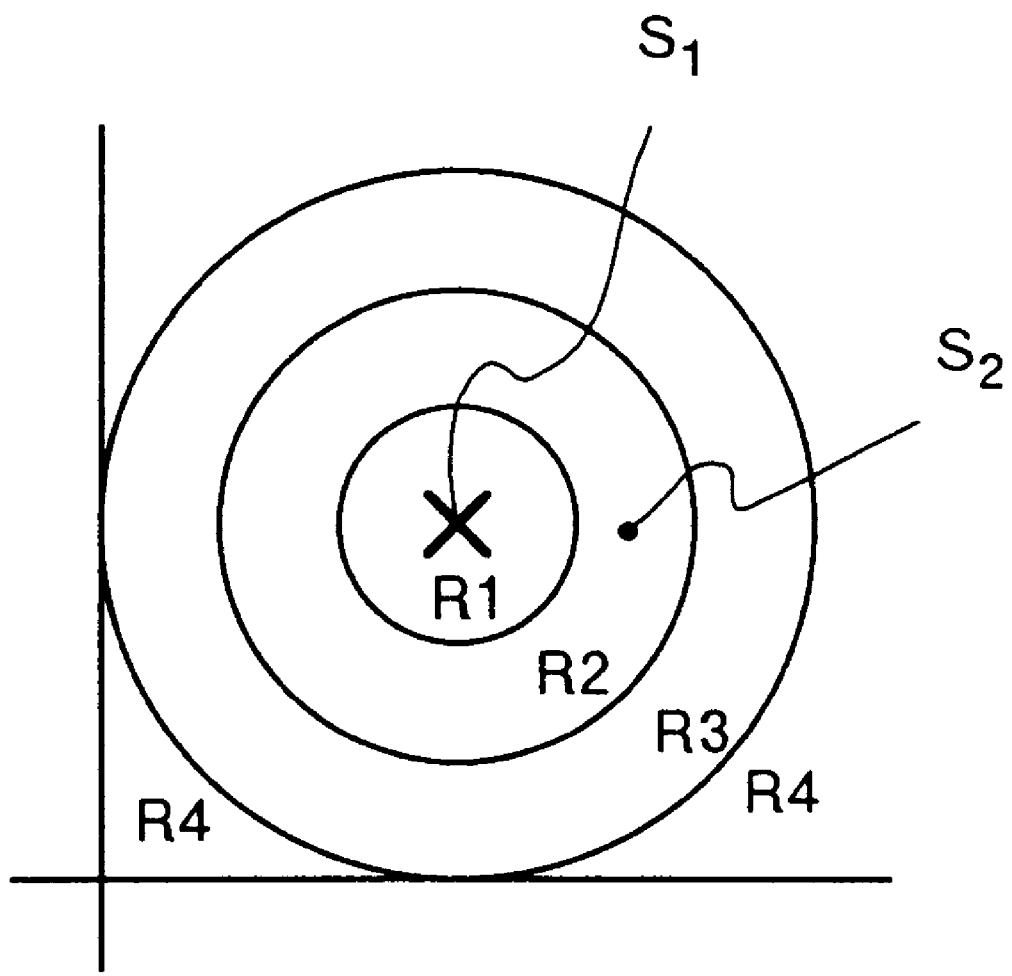
FIG. 7 is a diagram showing a decision region for phase/amplitude distribution when a QPSK-modulated signal is demodulated in a signal detecting section.

FIG. 7 is a diagram showing a decision region for phase/amplitude distribution when a QPSK-modulated signal is demodulated in the signal detecting section 101. Herein, the phase/amplitude distribution is a distribution of the signal points obtained by synthesizing the phase distribution corresponding to the amplitude distribution in Embodiments 1 and 2 on a phase/amplitude plane.

FIG. 7 especially shows a decision region for the amplitude of a signal point demodulated in the signal detecting section 101 as phase information $\pi/4$, and is referred to for deciding to which, a signal point corresponds, of the four phase/amplitude regions $R_1$, $R_2$, $R_3$, and $R_4$ showing common regions with the phase regions obtained by dividing the region into four regions as well as with amplitude regions obtained by dividing the region into four regions.

As for signal points demodulated as phase information $3\pi/4$, $-\pi/4$, $-3\pi/4$, the same types of phase/amplitude decision regions are present in the upper left quadrant, in the lower left quadrant and in the lower right quadrant respectively.

Herein, when a received signal having a phase information $\pi/4$ arrives through an ideal channel and a signal point outputted from the signal detecting section 101 is $S_1$, it is assumed that the signal point $S_1$ positions at the center of two phase/amplitude regions $R_1$ as shown in FIG. 7. Namely, in FIG. 7, it is regarded that the bit error rate and signal-to-noise power ratio are higher in order of the phase/amplitude regions $R_1$, $R_2$, $R_3$, and $R_4$.

In this case, the counter section 103 comprises counter sections in region 1, 2, 3 and 4 103-1, 103-2, 103-3, and 103-4 for counting a number of signal points corresponding to phase/amplitude regions corresponding to the phase/amplitude regions $R_1$, $R_2$, $R_3$ and $R_4$ respectively (namely, M=4). As shown in FIG. 7, when the signal point $S_1$ is transmitted as the transmission signal and is received as the signal point $S_2$ in the signal detecting section 101, it is decided by the phase/amplitude region deciding section 111 that this signal point $S_2$ is in the phase/amplitude region $R_2$, and it is counted by the counter section in region 2 103-2 corresponding to the phase/amplitude region $R_2$.

As described above, phase/amplitude distribution is obtained by deciding each phase/amplitude region for all the signals received by the signal detecting section 101 in a specified time period and the number of points in each phase/amplitude region are counted. It should be noted that phase/amplitude distribution probability similar to the above mentioned phase distribution probability can be derived from this phase/amplitude distribution.

The phase/amplitude-distribution table storing section 112 stores phase/amplitude-distribution tables each indicating a correlation between the phase/amplitude distribution probability and the signal quality for some of the channel models such as the fading channel or the Gaussian channel in the same manner as the phase-distribution table storing section 106.

Herein, the same as to the case of phase-distribution table, in the actual case, the phase/amplitude-distribution table has a table representing a relation between each phase/amplitude distribution probability and the signal quality obtained by actual measurement or simulation or theoretical computation or the like.

The likelihood calculating section 107 refers to the phase/amplitude-distribution table stored in the phase/amplitude-distribution table storing section 112. Then the likelihood calculating section 107 calculates likelihood corresponding to each phase/amplitude-distribution model for the phase/amplitude distribution obtained from a result of counting by the counter section 103 using an equation with which the count after the weighted average is calculated respectively, detects the maximum likelihood phase/amplitude-distribution model, and outputs the signal quality corresponding to the detected phase/amplitude-distribution model as an estimated signal quality.

As described above, with the signal quality measuring scheme according to Embodiment 3, as the scheme comprises the phase/amplitude region deciding section 111 and phase/amplitude-distribution table storing section 112, when signals transmitted as continuous signals are received or even when discontinuous data is received in bursts, it is possible to measure the bit error rate and the signal-to-noise power ratio due to the displacement of phase information or the variation in strength of received signals. Therefore signal quality can be estimated with higher precision.

It should be noted that, by inserting the weighted average calculating section 105 and weighted average storing section 104 each described in Embodiment 1 in between the counter section 103 and likelihood calculating section 107 and obtaining phase/amplitude distribution using the count after the weighted average, the same effects as those in Embodiment 1 can also be obtained.

Figure 8:
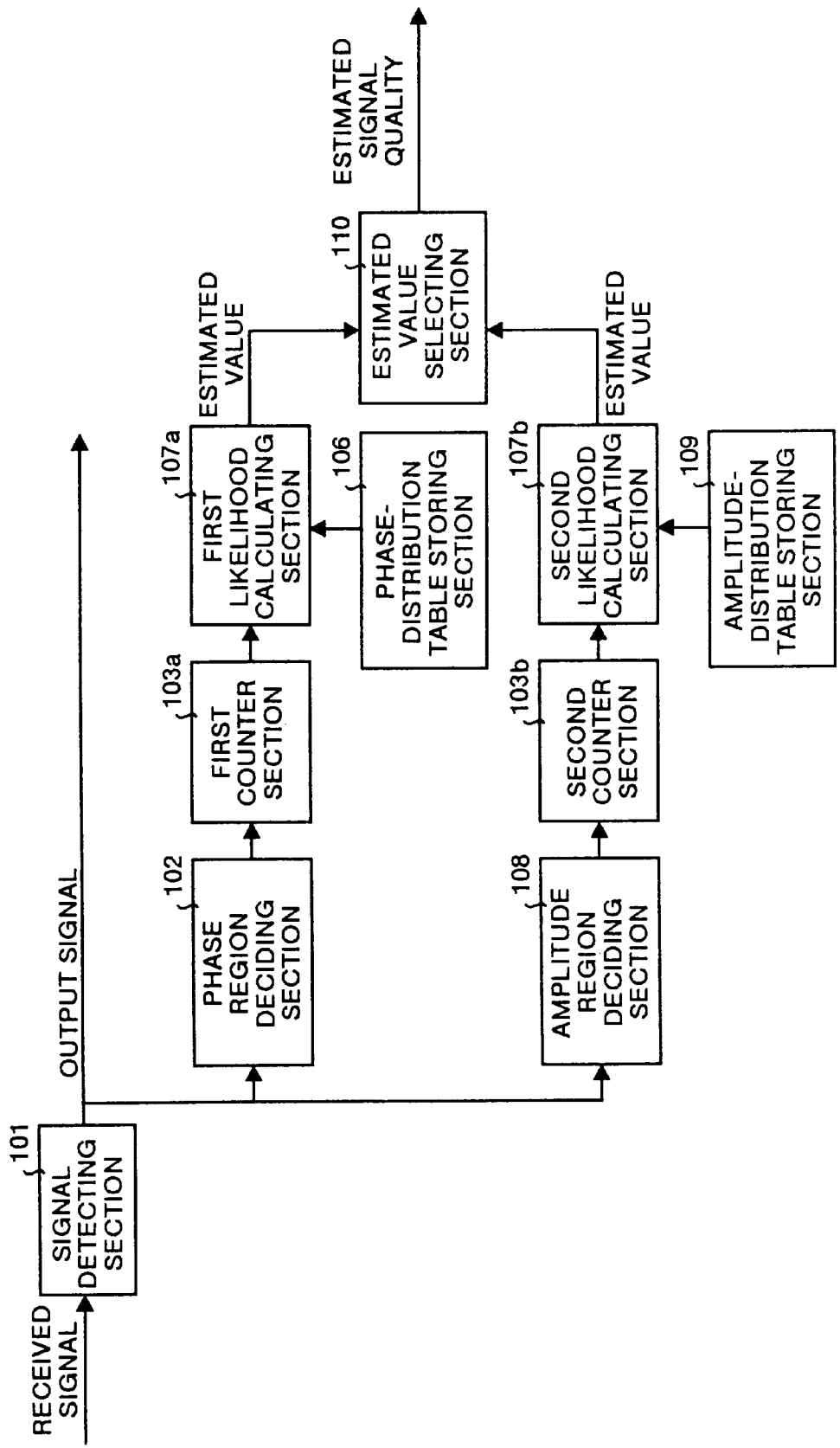
FIG. 8 is a block diagram showing general configuration of a signal quality measuring scheme according to Embodiment 4.

Next, a signal quality measuring scheme according to Embodiment 4 will be described. FIG. 8 is a block diagram showing general configuration of the signal quality measuring scheme according to Embodiment 4. It should be noted that the same reference numerals are assigned to the sections common to those in FIG. 1 and FIG. 4, and these descriptions are omitted.

The signal quality measuring scheme according to Embodiment 4 shown in FIG. 8 has a system comprising the phase region deciding section 102, counter section 103, likelihood calculating section 107, and phase-distribution table storing section 106 each corresponding to the conventional signal quality measuring scheme; and a system comprising the amplitude region deciding section 108, counter section 103, likelihood calculating section 107, and amplitude-distribution table storing section 109 each corresponding to the signal quality measuring scheme according to Embodiment 2 which are provided in parallel with each other. The scheme further comprises an estimated-value selecting section 110, which selects either one of an estimated value calculated based on decision on the phase region in the former system and an estimated value calculated based on decision on the amplitude region in the latter system, and outputs the selected value as an estimated signal quality.

It should be noted that, in FIG. 8, the counter section 103 in the former system will be referred to as the first counter section 103a, and the likelihood calculating section 107 will be referred to as the first likelihood calculating section 107a. On the other hand, the counter section 103 in the latter system will be referred to as the second counter section 103b, and the likelihood calculating section 107 will be referred to as the second likelihood calculating section 107b.

Accordingly, in the signal quality measuring scheme according to Embodiment 4, the signal point (which includes both the phase information and amplitude information) demodulated in the signal detecting section 101 is concurrently inputted in the phase region deciding section 102 and amplitude region deciding section 108. Then, in the same manner as the conventional signal quality measuring scheme, the phase region deciding section 102 and counter section 103 decide phase region for all the signals received by the signal detecting section 101, and obtain phase distribution by counting the signal points in each phase region.

While, the first likelihood calculating section 107a calculates an estimated signal quality using this phase distribution and the phase-distribution table stored in the phase-distribution table storing section 106.

On the other hand, in the same manner as the signal quality measuring scheme according to Embodiment 2, the amplitude region deciding section 108 and the second counter section 103b decide amplitude region for all the signals received by the signal detecting section 101, and obtain amplitude distribution by counting the signal points in each amplitude region. While, the second likelihood calculating section 107b calculates an estimated signal quality using this amplitude distribution and the amplitude-distribution table stored in the amplitude-distribution table storing section 108.

The estimated values calculated in the first likelihood calculating section 107a and in the second likelihood calculating section 107b as described above are inputted into the estimated value selecting section 110. The estimated-value selecting section 110 receives these estimated values and also receives the likelihood of the phase distribution obtained by the counter section 103a corresponding to the phase-distribution model calculated in the first likelihood calculating section 107a as well as the likelihood of the amplitude distribution obtained by the counter section 103b corresponding to the amplitude-distribution model calculated in the second likelihood calculating section 107b and compares these two likelihood. Then, the estimated-value selecting section 110 selects an estimated value calculated according to the higher likelihood in the comparison of the likelihood, and outputs the estimated value as a final estimated signal quality.

As described above, with the signal quality measuring scheme according to Embodiment 4, the scheme has a system for calculating an estimated signal quality based on decision on a phase region like in the conventional signal quality measuring scheme, and a system for calculating an estimated signal quality based on decision on an amplitude region like in the signal quality measuring scheme according to Embodiment 2, and further comprises an estimated-value selecting section 110 for selecting any one of the estimated values and outputting the selected value as a final estimated signal quality. Therefore, it is possible to measure signal quality of a channel with higher precision by estimating a higher likelihood of estimated values of the bit error rate or the signal-to-noise power ratio due to the displacement of phase information or the variation in strength of received signals.

It should be noted that, by inserting the weighted average calculating section 105 and weighted average storing section 104 each described in Embodiment 1 in between the counter section 103a and likelihood calculating section 107a as well as the counter section 103b and likelihood calculating section 107b respectively, and obtaining phase distribution as well as amplitude distribution using the count region the weighted average in the likelihood calculating section 107a and likelihood calculating section 107b, the same effects as those in Embodiment 1 can also be obtained.

Figure 9:
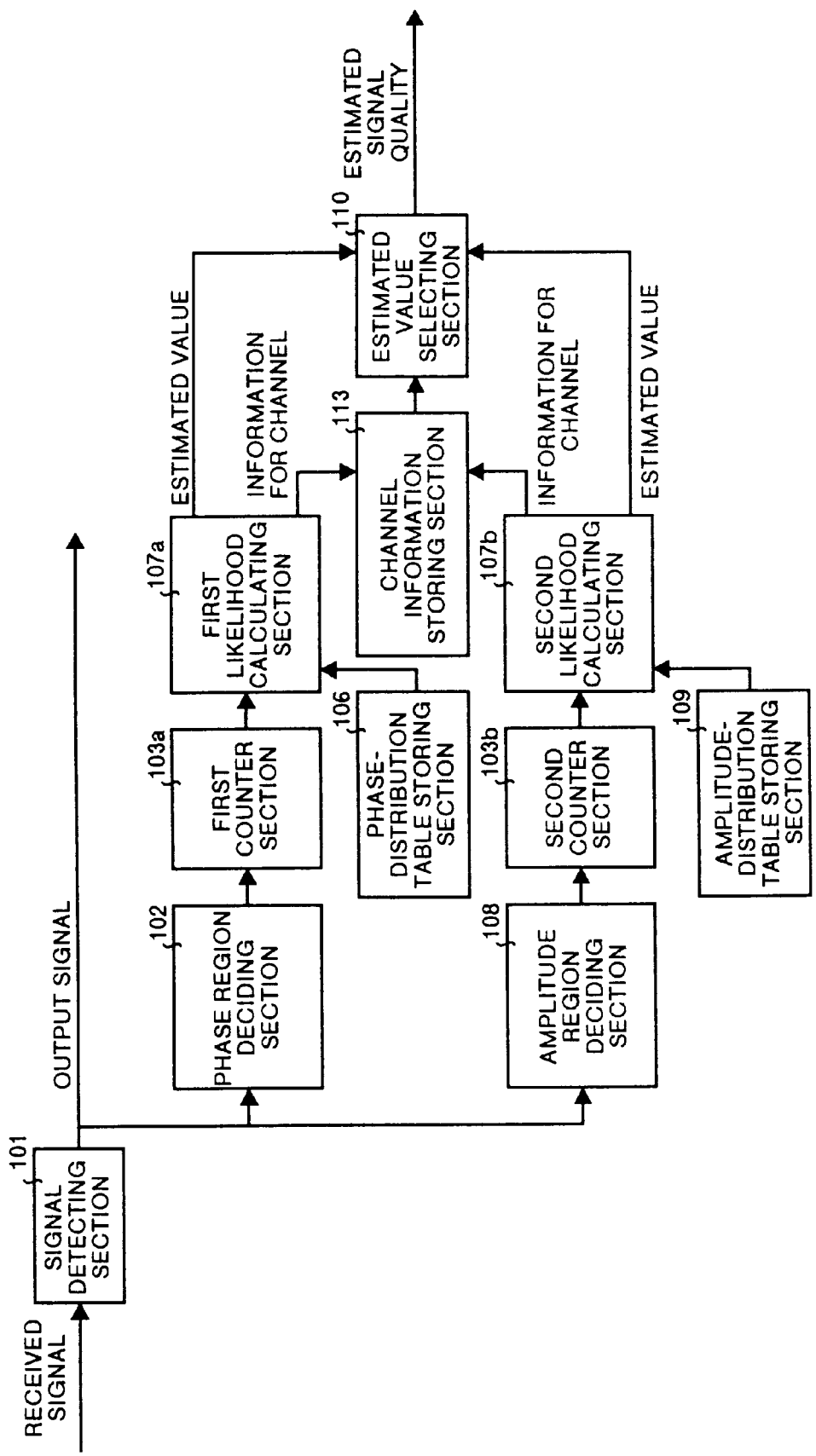
FIG. 9 is a block diagram showing general configuration of a signal quality measuring scheme according to Embodiment 5.

Next, a signal quality measuring scheme according to Embodiment 5 will be described. FIG. 9 is a block diagram showing a general configuration of the signal quality measuring scheme according to Embodiment 5. It should be noted that the same reference numerals are assigned to the sections common to those in FIG. 8, and these descriptions are omitted. The signal quality measuring scheme according to Embodiment 5 shown in FIG. 9 further comprises a channel information storing section 113 for storing channel model information corresponding to the phase-distribution model and amplitude-distribution model detected in the first likelihood calculating section 107a and in the second likelihood calculating section 107b in addition to the components of the signal quality measuring scheme according to Embodiment 4.

The estimated-value selecting section 110 refers to channel information in the past stored in the channel information storing section 113 for selecting either one of the estimated value calculated based on decision on a phase region and the estimated value calculated based on decision on an amplitude region, and decides the likelihood of the channel corresponding to the estimated value selected according to the comparison between the two likelihood described in Embodiment 4.

For example, when the channel model in the first likelihood calculating section 107a stored in the channel information storing section 113 continuously shows the same channel model in the past, and if the channel model currently detected in the first likelihood calculating section 107 is different from the model described above, further, the channel model for the second likelihood calculating section 107b stored in the channel information storing section 113 also continuously shows the same channel model in the past, and the second likelihood calculating section 107b decides whether the channel mode different from the model described above is detected or not this time.

When the change of the channel model detected in the first likelihood calculating section 107a is the same as that of the second likelihood calculating section 107b or when both are different from each other, an estimated value selected by ordinary comparison of likelihood therebetween is outputted. On the other hand, when the change of one of channel models detected in either the first likelihood calculating section 107a or the second likelihood calculating section 107b is not the same, an estimated value with the same change of the channel model is outputted even if the model shows a higher likelihood.

Although the description has assumed the case where the signal quality measuring scheme according to Embodiment 4 further comprises the channel information storing section 113, the signal quality measuring scheme according to Embodiments 1 to 3 further comprises the channel information storing section 113 so that likelihood of the channel corresponding to the detected estimated value can also be decided when each likelihood calculating section 107 outputs an estimated value. For example, when channel information is different with respect to the channel for the detected maximum likelihood, a phase or an amplitude or a phase/amplitude model, the maximum likelihood of the phase/amplitude or phase/amplitude model of the channel according to the channel information is selected, and the signal quality corresponding to the likelihood is decided as an estimated value.

As described above, with the signal quality measuring scheme according to Embodiment 5, as the scheme comprises the channel information storing section 113 for storing channel model information in the past detected in the likelihood calculating section, the likelihood of the currently calculated the estimated value can be decided by referring to the channel information in the past when an estimated value is to be outputted. Therefore, the signal quality can be estimated with higher precision.

Although a modulation mode has assumed a QPSK modulation in Embodiments 1 to 5, the present invention is also effective to even a case where a modulation different from the QPSK modulation is employed. Further, a communication mode other than the TDMA may be used. Further, the phase region may be divided based on a method different from the method described herein.

As described above, with the present invention, the phase region deciding unit decides in which phase region the signal point outputted from the signal detecting unit is included, the counter unit counts a number of the output signal points in the phase region for each phase region in a specified period of time, the weighted average calculating unit calculates a weighted average anew using the weighted average stored in the weighted average storing unit and a result of counting in the counter unit. The likelihood calculating unit detects the maximum likelihood phase-distribution model by calculating a likelihood of weighted averaged phase distribution as a result of calculation in the weighted average calculating unit using the phase-distribution table stored in the phase-distribution table storing unit for each phase-distribution model, and outputs the signal quality corresponding to the detected phase-distribution model as an estimated signal quality. Therefore, even if the time period for measurement of the signal quality is short, a result of measurement of signal points in the past can cumulatively be included by weighted average of the count of the signal points, signal quality can be measured with high precision, and further in such a case where a channel varies in association with time like discontinuous data transaction in bursts, signal quality can easily be measured with high precision for each burst even if a size of the burst is small.

With another aspect of the present invention, the amplitude region deciding unit decides in which amplitude region the signal point outputted from the signal detecting unit is included, the counter unit counts a number of the output signal points in the amplitude region for each amplitude region and in a specified period of time. The likelihood calculating unit detects the maximum likelihood amplitude-distribution model by calculating a likelihood of amplitude distribution of the received signals as a result of calculation in the counter unit for each amplitude-distribution model using the amplitude-distribution table stored in the amplitude-distribution table storing unit, and outputs the signal quality corresponding to the detected amplitude-distribution model as an estimated signal quality. Therefore, when signals transmitted as continuous signals are received or even when discontinuous data is received in bursts, it is possible to estimate the signal quality by measuring the amplitude of the received signals.

With another aspect of the present invention, the amplitude region deciding unit decides in which amplitude region the signal point outputted from the signal detecting unit is included, the counter unit counts a number of the output signal points in the amplitude region for each amplitude region and in a specified period of time, the weighted average calculating unit calculates a weighted average anew using the weighted average stored in the weighted average storing unit and a result of counting in the counter unit. Then the likelihood calculating unit detects the maximum likelihood amplitude-distribution model by calculating a likelihood of amplitude distribution weighted averaged as a result of calculation in the weighted average calculating unit for each amplitude-distribution model using the amplitude-distribution table stored in the amplitude-distribution table storing unit, and outputs the signal quality corresponding to the detected amplitude-distribution model as an estimated signal quality. Therefore, even if a time period for measurement of the signal quality is short, a result of measurement of signal points in the past can cumulatively be included by weighted average of the count of the signal points, and also signal quality can be estimated by measuring the amplitude of the received signals. This allows the signal quality of a channel to be measured with high precision.

With another aspect of the present invention, the phase/amplitude region deciding unit decides in which phase/amplitude region the signal point outputted from the signal detecting unit is included, the counter unit counts a number of the output signal points in the phase/amplitude region for each phase/amplitude region and in a specified period of time. Then the likelihood calculating unit detects the maximum likelihood phase/amplitude-distribution model by calculating a likelihood of phase/amplitude distribution of the received signals as a result of calculation in the counter unit for each phase/amplitude-distribution model using the phase/amplitude-distribution table stored in the phase/amplitude-distribution table storing unit, and outputs the signal quality corresponding to the detected phase/amplitude-distribution model as an estimated signal quality. Therefore, when signals transmitted as continuous signals are received or even when discontinuous data is received in bursts, it is possible to estimate the signal quality considering both the displacement of phase information and the variation in strength of the received signals. This allows the signal quality to be estimated with higher precision.

With another aspect of the present invention, the phase/amplitude region deciding unit decides in which phase/amplitude region the signal point outputted from the signal detecting unit is included, the counter unit counts a number of the output signal points in the phase/amplitude region for each phase/amplitude region and in a specified period of time, the weighted average calculating unit calculates a weighted average anew using a weighted average stored in the weighted average storing unit as well as a result of counting in the counter unit. Then the likelihood calculating unit detects the maximum likelihood phase/amplitude-distribution model by calculating a likelihood of weighted average phase/amplitude distribution as a result of calculation in the weighted average calculating unit for each phase/amplitude-distribution model using the phase/amplitude-distribution table stored in the phase/amplitude-distribution table storing unit, and outputs the signal quality corresponding to the detected phase/amplitude-distribution model as an estimated signal quality. Therefore, even if a time period for measurement of the signal quality is short, a result of measurement of signal points in the past can cumulatively be included by weighted average of the counts of the signal points, and also signal quality can be estimated considering both the displacement of phase information and the variation in strength of the received signals. This allows the signal quality of a channel to be estimated with higher precision.

With another aspect of the present invention, the channel information storing unit stores channel model information corresponding to the phase distribution model or the amplitude distribution model or the phase/amplitude-distribution model detected by the likelihood calculating unit, and the likelihood calculating unit selects a higher likelihood phase/amplitude-distribution model according to the channel model information in the past stored in the channel information storing unit and decides the signal quality for the selected model as an estimated value. Therefore, when an estimated value is outputted, a higher likelihood estimated value can be obtained by referring to the information regarding channel detected in the past. This allows the signal quality to be estimated with higher precision.

With another aspect of the present invention, the phase region deciding unit decides in which phase region the signal point outputted from the signal detecting unit is included, the first counter unit counts a number of the output signal points in the phase region for each phase region and in a specified period of time. The first likelihood calculating unit detects the maximum likelihood phase-distribution model by calculating a likelihood of phase distribution of the received signals as a result of calculation in the first counter unit for each phase-distribution model using the phase-distribution table stored in the phase-distribution table storing unit, and outputs the signal quality corresponding to the detected phase-distribution model as an estimated signal quality. The amplitude region deciding unit decides in which amplitude region the signal point outputted from the signal detecting unit is included, the second counter unit counts a number of the output signal points in the amplitude region for each amplitude region and in a specified period time. The second likelihood calculating unit detects the maximum likelihood amplitude-distribution model by calculating a likelihood of amplitude distribution of the received signals as a result of calculation in the second counter unit for each amplitude-distribution model using the amplitude-distribution table stored in the amplitude-distribution table storing unit, and outputs the signal quality corresponding to the detected amplitude-distribution model as an estimated signal. Finally, the estimated-value selecting unit compares the maximum likelihood outputted by the first likelihood calculating unit and that outputted by the second likelihood calculating unit and then outputs the estimated value calculated in either the first likelihood calculating unit or the second likelihood calculating unit as an estimated signal quality. Therefore, signal quality of a higher likelihood channel can be estimated considering both the displacement of phase information and the variation in strength of the received signals. This allows the signal quality to be estimated with higher precision.

With another aspect of the present invention, the phase region deciding unit decides in which phase region the signal point outputted from the signal detecting unit is included, the first counter unit counts a number of the output signal points in the phase region for each phase region and in a specified period of time, the first weighted average calculating unit calculates a weighted average anew using the weighted average stored in the first weighted average storing unit and a result of counting in the first counter unit. The first likelihood calculating unit detects the maximum likelihood phase-distribution model by calculating a likelihood of weighted averaged phase distribution as a result of calculation in the first weighted average calculating unit for each phase-distribution model using the phase-distribution table stored in the phase-distribution table storing unit, and outputs the signal quality corresponding to the detected phase-distribution model as an estimated signal quality. The amplitude region deciding unit decides in which amplitude region the signal point outputted from the signal detecting unit is included, the second counter unit counts a number of the output signal points in the amplitude region for each amplitude region and in a specified period of time, the second weighted average calculating unit calculates a weighted average anew using the weighted average stored in the second weighted average storing unit and a result of counting in the second counter unit. The second likelihood calculating unit detects the maximum likelihood amplitude-distribution model by calculating a likelihood of weighted average of amplitude distribution as a result of calculation in the second weighted average calculating unit for each amplitude-distribution model using the amplitude-distribution table stored in the amplitude-distribution table storing unit, and outputs the signal quality corresponding to the detected amplitude-distribution model as an estimated signal quality. Finally, the estimated-value selecting unit compares the maximum likelihood phase-distribution model calculated in the first likelihood calculating unit and that calculated in the second likelihood calculating unit and then outputs the estimated value calculated in either the first likelihood calculating unit or the second likelihood calculating unit as an estimated signal quality. Therefore, even if a time period for measurement of the signal quality is short, a result of measurement of signal points in the past can cumulatively be included by weighted average of the counts of the signal points, and also signal quality of a higher likelihood channel can be estimated considering both the displacement of phase information and the variation in strength of the received signals. This allows the signal quality to be estimated with higher precision.

With another aspect of the present invention, the channel information storing unit stores channel model information corresponding to the phase-distribution model and amplitude-distribution model each detected by the likelihood calculating units, and the estimated-value selecting unit outputs the estimated signal quality according to the channel model information in the past stored in the channel information storing unit. Therefore, when an estimated value is outputted, a higher likelihood estimated value can be selected by referring to the channel information detected in the past, and it is possible to decide which of estimated values should be outputted. This allows the signal quality to be estimated with higher precision.

With another aspect of the present invention, bit error rate which indicates the frequency of occurrence of the bit error in the received signals is used as an estimated signal quality.

With another aspect of the present invention, signal-to-noise power ratio which indicates the proportion of the signal power for 1-bit information of a received signal with respect to the noise power is used as an estimated signal quality.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A signal quality measuring scheme comprising:
  a signal detecting unit for detecting and demodulating received signals;
  a phase region deciding unit for deciding to which phase region of a plurality of different preset phase regions the signal point outputted from said signal detecting unit corresponds;
  a counter unit for counting a number of the output signal points corresponding to the phase region decided in said phase region deciding unit for each phase region in a specified period of time;
  a weighted average storing unit for storing a weighted average obtained by weighted average of the result of counting in said counter unit;
  a phase-distribution table storing unit for storing a table representing a relation between a phase distribution probability in each phase region obtained by actual measurement or simulation or theoretical computation and the signal quality for each different phase distribution models; and
  a likelihood calculating unit for detecting the maximum likelihood phase-distribution model by calculating a likelihood of phase distribution of the received signals indicated by a weighted average for each phase region calculated in said weighted average calculating unit for each phase-distribution model using the phase-distribution table stored in said phase-distribution table storing unit, and outputting the signal quality corresponding to the detected phase-distribution model as an estimated signal quality of said received signals.

2. A signal quality measuring scheme according to claim 1 further comprising:

a channel information storing unit for storing channel model information corresponding to said phase-distribution model or an amplitude-distribution model or a phase/amplitude-distribution model detected by said likelihood calculating unit;

wherein said likelihood calculating unit selects a higher likelihood phase-distribution model according to the channel model information stored in said channel information storing unit and decides the signal quality for the selected model as an estimated value.

3. A signal quality measuring scheme comprising:

a signal detecting unit for detecting and demodulating received signals;

an amplitude region deciding unit for deciding to which amplitude region of a plurality of different preset amplitude regions the signal point outputted from said signal detecting unit corresponds;

a counter unit for counting a number of the output signal points corresponding to the amplitude region decided in said amplitude region deciding unit for each amplitude region;

an amplitude-distribution table storing unit for storing a table representing a relation between an amplitude distribution probability in each amplitude region obtained by actual measurement or simulation or theoretical computation and the signal quality for each different amplitude distribution models; and a likelihood calculating unit for detecting the maximum likelihood amplitude-distribution model by calculating a likelihood of amplitude distribution of the received signals indicated by the count for each amplitude region counted in said counter unit for each amplitude-distribution model using the amplitude-distribution table stored in the amplitude-distribution table storing unit, and outputting the signal quality corresponding to the detected amplitude-distribution model as an estimated signal quality of the received signal.

4. A signal quality measuring scheme according to claim 3 further comprising:

a channel information storing unit for storing channel model information corresponding to a phase-distribution model or said amplitude-distribution model or a phase/amplitude-distribution model detected by said likelihood calculating unit;

wherein said likelihood calculating unit selects a higher likelihood phase-distribution model according to the channel model information stored in said channel information storing unit and decides the signal quality for the selected model as an estimated value.

5. A signal quality measuring scheme comprising:

a signal detecting unit for detecting and demodulating received signals;

an amplitude region deciding unit for deciding to which amplitude region of a plurality of different preset amplitude regions the signal point outputted from said signal detecting unit corresponds;

a counter unit for counting a number of the output signal points corresponding to the amplitude region decided in said amplitude region deciding unit for each amplitude region;

a weighted average storing unit for storing a weighted average obtained by weighted average of a result of counting in said counter unit;

an amplitude-distribution table storing unit for storing a table representing a relation between an amplitude distribution probability in each amplitude region obtained by actual measurement simulation or theoretical computation and the signal quality for each different amplitude distribution models; and a likelihood calculating unit for detecting the maximum likelihood amplitude-distribution model by calculating a likelihood of amplitude distribution of the received signals indicated by a weighted average for each amplitude region calculated in said weighted average calculating unit for each amplitude-distribution model using the amplitude-distribution table stored in said amplitude-distribution table storing unit, and outputting the signal quality corresponding to the detected amplitude-distribution model as an estimated signal quality of the received signals.

6. A signal quality measuring scheme according to claim 5 further comprising:

a channel information storing unit for storing channel model information corresponding to a phase-distribution model or said amplitude-distribution model or a phase/amplitude-distribution model detected by said likelihood calculating unit;

wherein said likelihood calculating unit selects a higher likelihood phase-distribution model according to the channel model information stored in said channel information storing unit and decides the signal quality for the selected model as an estimated value.

7. A signal quality measuring scheme comprising:

a signal detecting unit for detecting and demodulating received signals;

a phase/amplitude region deciding unit for deciding to which phase/amplitude region of a plurality of different phase/amplitude regions preset on a phase/amplitude plane the signal point outputted from said signal detecting unit corresponds;

a counter unit for counting a number of output signal points corresponding to the phase/amplitude region decided in said phase/amplitude region deciding unit for each phase/amplitude region;

a phase/amplitude-distribution table storing unit for storing a table representing a relationship between a phase/amplitude distribution probability in each phase/amplitude region and the signal quality for each different phase/amplitude distribution model obtained by actual measurement or simulation or theoretical computation; and a likelihood calculating unit for detecting the maximum likelihood phase/amplitude-distribution model by calculating a likelihood of phase/amplitude distribution of the received signals indicated by the count for each phase/amplitude region counted in said counter unit for each phase/amplitude-distribution model using the phase/amplitude distribution table stored in said phase/amplitude-distribution table storing unit, and outputting the signal quality corresponding to the detected phase/amplitude-distribution model as an estimated signal quality of the received signal, wherein signal quality of said received signals can be estimated based on both displacement of phase information and variations in signal strength.

8. A signal quality measuring scheme according to claim 7 further comprising:
a channel information storing unit for storing channel model information corresponding to the phase-distribution model or the amplitude-distribution model or the phase/amplitude-distribution model detected by said likelihood calculating unit;
wherein said likelihood calculating unit selects a higher likelihood phase-distribution model according to the channel model information stored in said channel information storing unit and decides a signal quality for the selected model as an estimated value.

9. A signal quality measuring scheme comprising:
a signal detecting unit for detecting and demodulating received signals;
a phase/amplitude region deciding unit for deciding to which phase/amplitude region of a plurality of different preset phase/amplitude regions on a phase/amplitude plane the signal point outputted from said signal detecting unit corresponds;
a counter unit for counting a number of the output signal points corresponding to the phase/amplitude region decided in said phase/amplitude region deciding unit for each phase/amplitude region;
a weighted average storing unit for storing a weighted average obtained by weighted average of the result of counting in said counter unit;
a weighted average calculating unit for calculating a weighted average anew using the weighted average stored in said weighted average storing unit as well as the result of counting in said counter unit;
a phase/amplitude-distribution table storing unit for storing a table representing a relation between a phase/amplitude distribution probability in each phase/amplitude region obtained by actual measurement or simulation or theoretical computation and a value indicating the signal quality for each different phase/amplitude distribution models; and
a likelihood calculating unit for detecting the maximum likelihood phase/amplitude-distribution model by calculating a likelihood of phase/amplitude distribution of the received signals indicated by a weighted average for each phase/amplitude region calculated in said weighted average calculating unit for each phase/amplitude-distribution model using the phase/amplitude-distribution table stored in said phase/amplitude-distribution table storing unit, and outputting the signal quality corresponding to the detected phase/amplitude-distribution model as an estimated signal quality of the received signals.

10. A signal quality measuring scheme according to claim 9 further comprising:
a channel information storing unit for storing channel model information corresponding to the phase-distribution model or the amplitude-distribution model or the phase/amplitude-distribution model detected by said likelihood calculating unit;
wherein said likelihood calculating unit selects a higher likelihood phase-distribution model according to the channel model information stored in said channel information storing unit and decides a signal quality for the selected model as an estimated value.

11. A signal quality measuring scheme comprising:
a signal detecting unit for detecting and demodulating received signals;
a phase region deciding unit for deciding to which phase region of a plurality of different preset phase regions the signal point outputted from said signal detecting unit corresponds;
a first counter unit for counting a number of the output signal points corresponding to the phase region decided in said phase region deciding unit for each phase region in a specified period of time;
a phase-distribution table storing unit for storing a table representing a relation between a phase distribution probability in each phase region obtained by actual measurement or simulation or theoretical computation and the signal quality for each different phase distribution models;
a first likelihood calculating unit for detecting the maximum likelihood phase-distribution model by calculating a likelihood of phase distribution of the received signals indicated by the count for each phase region counted in said first counter unit for each phase-distribution model using the phase-distribution table stored in said phase-distribution table storing unit, and outputting the signal quality corresponding to the detected phase-distribution model as an estimated signal quality of the received signals;
an amplitude region deciding unit for deciding to which amplitude region of a plurality of different preset amplitude regions the signal point outputted from said signal detecting unit corresponds;
a second counter unit for counting a number of the output signal points corresponding to the amplitude region decided in said amplitude region deciding unit for each amplitude region;
an amplitude-distribution table storing unit for storing a table representing a relation between an amplitude distribution probability in each amplitude region obtained by actual measurement or simulation or theoretical computation or the like and the signal quality for each different amplitude distribution models;
a second likelihood calculating unit for detecting the maximum likelihood amplitude-distribution model by calculating a likelihood of amplitude distribution of the received signals indicated by the count for each amplitude region counted in said second counter unit for each amplitude-distribution model using the amplitude-distribution table stored in said amplitude-distribution table storing unit, and outputting the signal quality corresponding to the detected amplitude-distribution model as an estimated signal quality of the received signals; and
an estimated-value selecting unit for comparing the likelihood of the maximum likelihood phase-distribution model calculated in said first likelihood calculating unit with the likelihood of the maximum likelihood amplitude-distribution model calculated in said second likelihood calculating unit and then deciding the estimated value calculated in either said first likelihood calculating unit or said second likelihood calculating unit as an estimated signal quality of the received signals.

12. A signal quality measuring scheme according to claim 11 further comprising:
a channel information storing unit for storing channel model information corresponding to the phase-distribution model and the amplitude-distribution model each detected by said first likelihood calculating unit and said second likelihood calculating unit respectively;

wherein the estimated-value selecting unit outputs the estimated value calculated in either said first likelihood calculating unit or said second likelihood calculating unit as an estimated signal quality of the received signals according to the channel model information stored in said channel information storing unit.

13. A signal quality measuring scheme comprising:

a signal detecting unit for detecting and demodulating received signals;

a phase region deciding unit for deciding to which phase region of a plurality of different preset phase regions the signal point outputted from said signal detecting unit corresponds;

a first counter unit for counting a number of the output signal points corresponding to the phase region decided in said phase region deciding unit for each phase region in a specified period of time;

a first weighted average storing unit for storing a weighted average obtained by weighted average of the result of counting in said first counter unit;

a phase-distribution table storing unit for storing a table representing a relation between a phase distribution probability in each phase region obtained by actual measurement or simulation or theoretical computation and the signal quality for each different phase distribution models;

a first likelihood calculating unit for detecting the maximum likelihood phase-distribution model by calculating a likelihood of phase distribution of the received signals indicated by a weighted average for each phase region calculated in said weighted average calculating unit for each phase-distribution model using the phase-distribution table stored in said phase-distribution table storing unit, and outputting the signal quality corresponding to the detected phase-distribution model as an estimated signal quality of the received signals;

an amplitude region deciding unit for deciding to which amplitude region of a plurality of different preset amplitude regions the signal point outputted from said signal detecting unit corresponds;

a second counter unit for counting a number of the output signal points corresponding to the amplitude region decided in said amplitude region deciding unit for each amplitude region;

a second weighted average storing unit for storing a weighted average obtained by weighted average of a result of counting in said second counter unit;

an amplitude-distribution table storing unit for storing a table representing a relation between an amplitude distribution probability in each amplitude region obtained by actual measurement simulation or theoretical computation and the signal quality for each different amplitude distribution models;

a second likelihood calculating unit for detecting the maximum likelihood amplitude-distribution model by calculating a likelihood of amplitude distribution of the received signals indicated by a weighted average for each amplitude region calculated in said weighted average calculating unit for each amplitude-distribution model using the amplitude-distribution table stored in said amplitude-distribution table storing unit, and outputting the signal quality corresponding to the detected amplitude-distribution model as an estimated signal quality of the received signals; and an estimated-value selecting unit for comparing the likelihood of the maximum likelihood phase-distribution model calculated in said first likelihood calculating unit with the degree of the maximum likelihood amplitude-distribution model calculated in said second likelihood calculating unit and then deciding the estimated value calculated in either said first likelihood calculating unit or said second likelihood calculating unit as an estimated signal quality of the received signals.

14. A signal quality measuring scheme according to claim 13 further comprising:

a channel information storing unit for storing channel model information corresponding to said phase-distribution model and said amplitude-distribution model each detected by said first likelihood calculating unit and said second likelihood calculating unit respectively;

wherein the estimated-value selecting unit outputs the estimated value calculated in either said first likelihood calculating unit or said second likelihood calculating unit as an estimated signal quality of the received signals according to the channel model information stored in said channel information storing unit.

* * * * *

UNITED STATES PATENT AND TRADEMARK OFFICE
CERTIFICATE OF CORRECTION

PATENT NO. : 6,115,417

DATED : September 5, 2000

INVENTOR(S) : Mari MATSUNAGA et al.

It is certified that error appears in the above-identified patent and that said Letters Patent are hereby corrected as shown below:

Column 22, line 53, delete "the".

Column 22, line 63, after "computation", insert --,--.

Signed and Sealed this

Eighth Day of May, 2001

*Attest:*

NICHOLAS P. GODICI

*Attesting Officer*        *Acting Director of the United States Patent and Trademark Office*